US012160698B2

(12) United States Patent
Koneru et al.

(10) Patent No.: US 12,160,698 B2
(45) Date of Patent: Dec. 3, 2024

(54) AUDIO DEVICE WITH WINGTIP ANCHOR

(71) Applicant: Apple Inc., Cupertino, CA (US)

(72) Inventors: Vijay Karthik Koneru, Redondo Beach, CA (US); Robert A. Boyd, Los Angeles, CA (US); Matthew Costello, Soquel, CA (US); Duy P. Le, Venice, CA (US); Joseph F. Dembs, Los Angeles, CA (US); Guillaume Raoult, San Francisco, CA (US); Elvin Chu, San Francisco, CA (US); Christopher Kuh, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 119 days.

(21) Appl. No.: 17/851,867

(22) Filed: Jun. 28, 2022

(65) Prior Publication Data

US 2023/0091575 A1 Mar. 23, 2023

Related U.S. Application Data

(60) Provisional application No. 63/247,132, filed on Sep. 22, 2021.

(51) Int. Cl.
*H04R 1/10* (2006.01)

(52) U.S. Cl.
CPC ........... *H04R 1/105* (2013.01); *H04R 1/1016* (2013.01); *H04R 1/1041* (2013.01); *H04R 1/1075* (2013.01); *H04R 2420/07* (2013.01)

(58) Field of Classification Search
CPC ...... H04R 1/105; H04R 1/106; H04R 1/1041; H04R 1/1075; H04R 2420/07
(Continued)

(56) References Cited

U.S. PATENT DOCUMENTS 6,919,519 B2 7/2005 Ravnkilde et al.
8,094,851 B2 1/2012 Heerlein et al.
(Continued)

FOREIGN PATENT DOCUMENTS

CN 210670516 U 6/2020
DE 10 2006 018 631 A1 10/2007
(Continued)

OTHER PUBLICATIONS

"Google Pixel Buds." Downloaded from https://store.google.com/us/product/pixel_buds?hl=en-us. 3 pages.
(Continued)

*Primary Examiner* — Sean H Nguyen
(74) *Attorney, Agent, or Firm* — Kilpatrick Townsend & Stockton LLP

(57) ABSTRACT

Portable ear-worn acoustic devices having a wingtip anchor for improved anchoring for active users and to accommodate a wide range of ear sizes and shapes are provided herein. Such acoustic devices an include an earbud device body and a wingtip anchor that extends from an outer face of the device body. The wingtip anchor can include a base portion and a protruding portion that extends upwards and is angled or curved inwardly so as to engage the upper concha of the ear. The wingtip anchor can be flexible so that engagement of a distal portion of the anchor exerts an inwardly directed spring force on the device body to maintain the earbud device body within the ear. Such acoustic devices can further include a multi-function button that is integrated with the wingtip anchor such that the base portion of the wingtip anchor is a faceplate for the multi-function button.

20 Claims, 19 Drawing Sheets

(58) Field of Classification Search
USPC ........................................................ 381/328
See application file for complete search history.

(56) References Cited

U.S. PATENT DOCUMENTS

| | | | | |
|---|---|---|---|---|
| 8,249,287 | B2 | 8/2012 | Silvestri et al. | |
| 8,314,354 | B2 | 11/2012 | Prest et al. | |
| 9,036,853 | B2 | 5/2015 | Silvestri et al. | |
| 9,131,311 | B2 | 9/2015 | Lumsden et al. | |
| 9,596,532 | B2 | 3/2017 | Rye | |
| 9,712,932 | B2 | 7/2017 | Dundas | |
| 9,723,416 | B2 | 8/2017 | Babico | |
| 9,805,590 | B2 | 10/2017 | Shennib | |
| 9,980,063 | B2 | 5/2018 | Johnson | |
| 9,992,589 | B2 | 6/2018 | Ochsenbein et al. | |
| 10,097,913 | B2 | 10/2018 | Zorkendorfer et al. | |
| 10,206,474 | B2 | 2/2019 | Brzezinski et al. | |
| 10,433,045 | B2 * | 10/2019 | Trainer | H04R 1/105 |
| 10,602,255 | B2 | 3/2020 | Sandanger | |
| 11,146,880 | B2 * | 10/2021 | Sandanger | H04R 25/652 |
| 11,245,974 | B2 | 2/2022 | Guo et al. | |
| 11,245,989 | B2 | 2/2022 | Nielsen et al. | |
| 11,368,795 | B2 | 6/2022 | Nielsen et al. | |
| 11,375,058 | B2 | 6/2022 | Kuzhiyil | |
| 11,425,479 | B2 | 8/2022 | Liu et al. | |
| 2009/0073950 | A1 | 3/2009 | Guccione et al. | |
| 2011/0176699 | A1 | 7/2011 | Lin | |
| 2014/0088504 | A1 | 3/2014 | King | |
| 2015/0350764 | A1 * | 12/2015 | Briggs | H04R 1/1016 381/384 |
| 2016/0073186 | A1 | 3/2016 | Searl et al. | |
| 2016/0261942 | A1 * | 9/2016 | Hayden | H04R 1/1016 |
| 2018/0070165 | A1 * | 3/2018 | Hatfield | H04R 1/1058 |
| 2020/0107099 | A1 | 4/2020 | McIntosh | |
| 2020/0245049 | A1 * | 7/2020 | Karayiannis | H04R 1/1041 |
| 2022/0248120 | A1 * | 8/2022 | Ito | H04R 25/607 |

FOREIGN PATENT DOCUMENTS

| | | | |
|---|---|---|---|
| DE | 10 2008 038 212 | A1 | 12/2009 |
| DE | 10 2009 012 630 | A1 | 9/2010 |
| DE | 10 2012 211 583 | A1 | 8/2013 |
| DE | 10 2019 214 158 | A1 | 6/2020 |
| EP | 2 063 665 | A2 | 5/2009 |
| WO | 2022/148347 | A1 | 7/2022 |

OTHER PUBLICATIONS

Non-patent literature downloaded from https://www.jaybirdsport.com/en-us/vista.985-000865.html. 2 pages.

Non-patent literature downloaded from https://www.net.com/pictures/beatsx-earphones-photos/2/. 3 pages.

Non-patent literature downloaded form https://soundreview.org/audio/beats-tour-2-sports-review/. 2 pages.

* cited by examiner

AUDIO DEVICE WITH WINGTIP ANCHOR

CROSS-REFERENCE TO RELATED APPLICATIONS

This application claims priority under 35 U.S.C. § 119(e) to U.S. Provisional Application No. 63/247,132, filed on Sep. 22, 2021 entitled, "AUDIO DEVICE WITH WINGTIP ANCHOR," the contents of which are herein incorporated by reference.

BACKGROUND

Portable audio devices, such as headphones, can be used with a wide variety of electronic devices such as portable media players, smart phones, tablet computers, laptop computers, stereo systems, and other types of devices. Portable audio devices have historically included one or more small speakers configured to be place on, in, or near a user's ear, structural components that hold the speakers in place, and a cable that electrically connects the portable audio device to an audio source. Wireless portable audio devices that do not include a cable and instead, wirelessly receive a stream of audio data from a wireless audio source, have become ubiquitous. Such wireless portable audio devices can include, for instance, wireless earbud devices or wireless in-ear hearing devices that operate in pairs (one for each ear) or individually for outputting sound to, and receiving sound from, the user.

Although such audio devices have found widespread use and acceptance among the public, there remain challenges and drawbacks associated with their use. For example, active users engaged in various activities, such as exercising or running, occasionally experience the earbud moving or falling from their ear. While various contoured designs and protruding anchors have been developed to address this issue, many active users still experience dislodging of the earbud during activity. This problem further amplified for active users having smaller or larger than average ear volumes. While some conventional earbuds offer anchoring components of differing sizes and shapes to accommodate differing ear sizes and shapes, it is often time-consuming and difficult for a user to determine what size and shape of anchoring works best for their particular ear shape. Additionally, removing and interchanging between multiple differing anchors can be problematic as it often required an iterative approach during which a user may lose one or more anchoring component.

These challenges are even greater in wireless earbuds, which tend to be bulkier and heavier, such that they are more prone to being dislodge and falling out of a user's ear. Further, many such wireless earbuds include one or more user interface features, such as a function upon the user tapping the earbud or squeezing or twisting an antenna portion, which may also cause the earbud to dislodge from the user's ear.

While various improvement have been made in recent earbud designs, none so far have overcome the above-noted challenges. Thus, there is a need for improved ear bud designs that securely anchor within the ears of active users, as well as earbuds that do not require multiple sizes of anchors. There is further need for improved ear bud designs that allow the user to actuate a function of the earbud without moving or dislodging the earbud.

BRIEF SUMMARY

The present disclosure describes various embodiments of portable audio devices having a wingtip anchor design that provides more secure anchoring within the ear for active users, that accommodates a wide range of varying ear sizes and shapes, and that allows a user to easily actuate functions by engaging the wingtip anchor itself.

In one aspect, the invention pertain to a portable acoustic device, worn in an ear of a user, that includes a device housing and an anchor (e.g. a wingtip shaped anchor) that extends from the device housing for securing the device in the ear. In some embodiments, the device includes a device housing defining an internal cavity, the device housing being sized and shaped to reside, at least party, within a lower concha of the ear of the user, and having an inner side that engages the lower concha and an outer side that faces away from the user when worn in the ear. An acoustic port is formed through an acoustic nozzle defined by the device housing and is aligned with an auditory canal of the user in the lower concha. An audio driver is disposed within the device housing and aligned to emit sound through the acoustic port. The anchor can includes a base portion and a projection portion. In some embodiments, the base portion couples to the device body and extends in a rearward direction and the projection portion extends distally upwards and in a forward direction, when the device is worn in the ear of the user. In some embodiments, the projection portion further extends in an inward direction towards the user so that a distal end of the projection portion is disposed within the upper concha of the ear, which causes a force exerted by the inferior root of the antihelix to secure the device body within the lower concha with the acoustic port secured in the auditory canal. In some embodiments, the anchor is an integrally formed component.

In another aspect, the acoustic device is designed so that the outer facing side of the device housing is spaced at least 10 mm outward from the audio nozzle or at least 10 mm from the inner side of the device housing that engages the lower concha so as to provide sufficient clearance to extend over the crus helix of the ear, which also avoids a sensitive recessed area of the ear. In some embodiments, a distal portion of the projection portion angles inward at an angle between 40-50 degrees relative a horizontal plane extending through the acoustic port so that the distal portion enters the upper concha. In some embodiments, the base portion of the anchor extends in a rearward direction between 110 and 130 degrees relative the horizontal plane extending through the acoustic port. In some embodiments, the projection portion extends upwards by a vertical distance between 15 and 25 mm from the horizontal plane extending through the acoustic port so as to accommodate a range of ear sizes. In some embodiments, the projection portion extends along a curve that extends rearward from the base portion and forward in a distal direction, where the curve has a radius between 15 and 25 mm.

In yet another aspect, the anchor has one or more flattened surfaced to facilitate engagement for anchoring or manual engagement for operating a multifunction button. In some embodiments, the distal portion of the projection portion has a flattened outer surface to facilitate engagement against the inner facing surface of the lower crura. The width of the flattened outer surface along the distal portion can be between 2 and 5 mm. In some embodiments, a majority of a width of the flattened outer surface of the projection portion is between 2 mm and 8 mm. In some embodiments, the base portion has a flattened outer surface defining a faceplate of a multi-function button. A majority of a width of the flattened outer surface of the base portion can be between 8 and 15 mm. In some embodiments, the anchor comprises a polymer having a shore hardness between 0 and 80 on a shore A scale, preferably 50 on a shore A scale.

In some embodiments, the device body is hard plastic that is shaped and contoured to substantially fill the lower concha of the ear. The device body can be of a generally elongated shape having a length dimension between 15 and 20 mm, a height dimension between of 10 and 15 mm and a width dimension between 10 and 15 mm, so as to substantially fill the lower concha of the ear. In some embodiments, the anchor is a separate component that is coupled to the device housing by the base portion. In some embodiments, the anchor is attached to the device housing such that it non-removable by the user.

In another aspect, the invention pertain to a portable acoustic device having a device body and an anchor extending from the device body, where the anchor is integrated with a multi-function button. In some embodiments, the device includes a rocker switch disposed in the device housing that is configured for controlling a function of the device upon actuation. The anchor includes a base portion and a distal projection portion, where the base portion is coupled to the device housing adjacent the rocker switch such that manual contact of the anchor actuates the rocker switch. In some embodiments, the base portion of the anchor is movably attached to the device housing and covers the rocker switch in the device housing. The rocker switch can include a movable plunger that moves, upon manual contact with the base portion of the anchor, so as to actuate the rocker switch.

To better understand the nature and advantages of the present invention, reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

DETAILED DESCRIPTION

Figure 1:
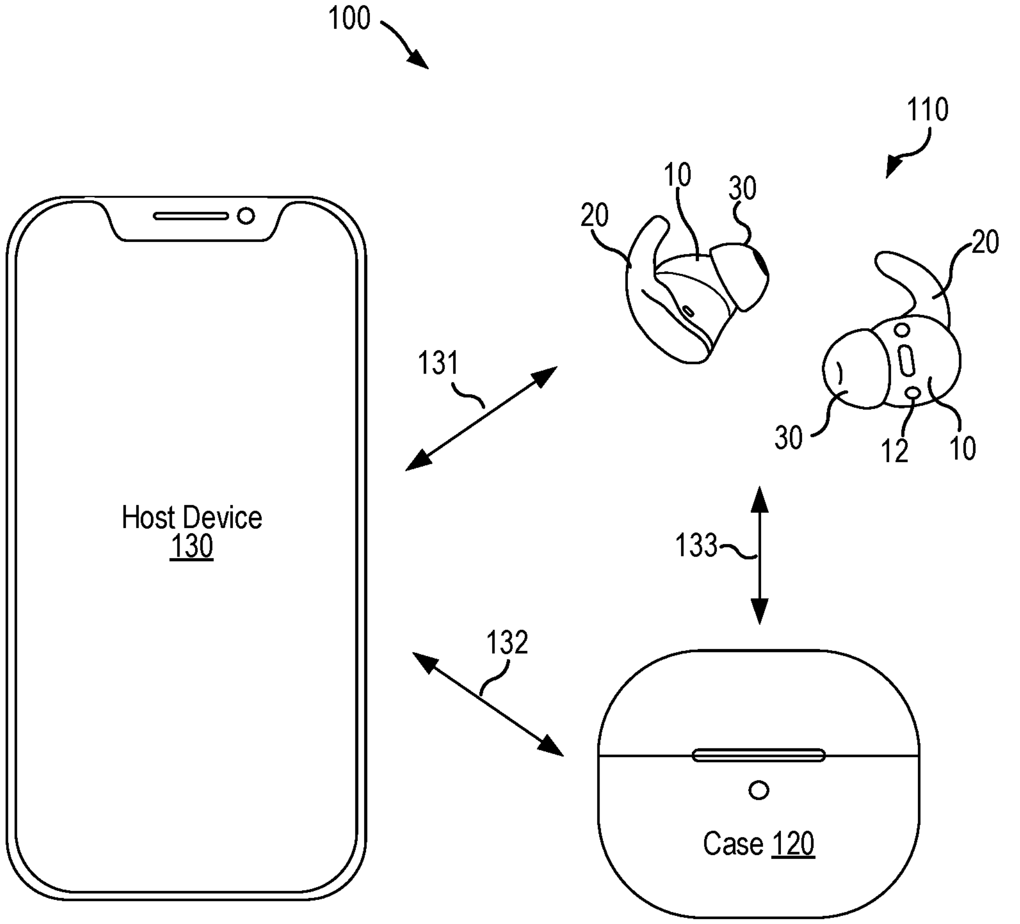
FIG. 1 is a simplified illustration of an exemplary portable electronic audio device system having a host device configured as a smart phone, a case, and a pair of wireless audio earbud devices, according to some embodiments.

The present disclosure pertains to portable audio devices that can deliver high-end acoustic performance to a user along with a pleasant and intuitive user experience, particularly wireless portable audio devices. Specifically, the disclosure pertains to portable audio devices with a specially designed wingtip anchor that securely anchors the earbud within the air. Some embodiments pertain to a wingtip anchor that is of a universal design that accommodates a wide range of adult and teen users with ears of differing sizes and shapes. Accordingly, the universal wingtip anchor can be integral or attached to the earbud device body so as to be non-removable by the user. Still other embodiments pertain to an earbud anchor that is integrated with a multi-function button so that manual engagement with the wingtip anchor actuates device functions.

As used herein, the term "portable audio device" includes any portable device configured to be worn in the user's ear and placed such that a speaker of the portable audio device is at least partly within the user's ear. A "portable wireless audio device" is a portable audio device that is able to receive and/or send streams of audio data from or to a second device without a wire connecting the portable wireless audio device to the second device using, for example, a wireless communication protocol.

Headphones are one type of portable audio device, headsets (a combination of a headphone and an attached microphone) are another and hearing aids (in-ear devices that are designed to augment sounds from the surrounding environment to improve a user's hearing) are still an additional type of portable audio device. The term "headphones" represents a pair of small, portable audio devices that are designed to be worn on or around a user's head. They convert an electrical signal to a corresponding sound that can be heard by the user. Headphones include traditional headphones that are worn over a user's head and include left and right ear cups connected to each other by a headband, and earphones (very small headphones that are designed to be fitted directly in a user's ear). Traditional headphones include both over-ear headphones (sometimes referred to as either circumaural or full-size headphones) that have ear pads that fully encompass a user's ears, and on-ear headphones (sometimes referred to as supra-aural headphones) that have ear pads pressing against a user's ear instead of surrounding the ear.

The term "earphones", which can also be referred to as ear-fitting headphones, includes both small headphones, sometimes referred to as "earbuds", that fit within a user's outer ear facing the ear canal without being inserted into the ear canal, and in-ear headphones, sometimes referred to as canal phones, that are inserted in the ear canal itself. Thus, earphones can be another type of portable audio device that are configured to be positioned substantially within a user's ear. As used herein, the term "ear tip", which can also be referred to as an ear canal mold, includes pre-formed, post-formed, or custom-molded sound-directing structures that at least partially fit and seal within an ear canal. Typically, ear tips are thin bell-shaped structures formed of thin flexible silicone polymer so as to acoustically seal the ear canal and are formed to have a comfortable fit capable of being worn for long periods of time. Ear tips can be removable and interchangeable, and provided in different sizes and shapes to achieve a better seal with a user's ear canal and/or ear cavity.

Example Wireless Audio System

FIG. 1 is an example of a wireless audio system 100 according to some embodiments. System 100 can include a pair of portable audio earbud devices 110, a host device 130, and a charging case 120 for charging the audio earbud device 10. Host device 130 is depicted in FIG. 1 as a smart phone but can be any electronic device that can transmit audio data to portable audio devices 110. Other, non-limiting examples of suitable host devices 130 include a laptop computer, a desktop computer, a tablet computer, a smart watch, an audio system, a video player, and the like.

As depicted graphically in FIG. 1, host device 130 can be wirelessly communicatively coupled with portable wireless audio devices 110 and charging case 120 through wireless communication links 131 and 132. Similarly, portable wireless audio devices 110 can be communicatively coupled to charging case 120 via wireless communication link 133. Each of the wireless communication links 131, 132 and 133 can be a known and established wireless communication protocol, such as a Bluetooth protocol, a WiFi protocol, or any other acceptable protocol that enables electronic devices to wirelessly communicate with each other. Thus, host device 130 can exchange data directly with portable wireless audio devices 10, such as audio data, that can be transmitted over wireless link 131 to wireless audio devices 110 for play back to a user, and audio data that can be received by host device 130 as recorded/inputted from microphones in the portable wireless audio devices 110. Host device 130 can also be wirelessly communicatively coupled with charging case 120 via wireless link 132 so that the host device 130 can exchange data with the charging case, such as data indicating the battery charge level data for case 120, data indicating the battery charge level for portable wireless audio devices 110, and data indicating the pairing status of portable wireless audio devices 110.

Portable wireless audio devices 110 can be stored within case 120, which can protect the devices 110 from being lost and/or damaged when they are not in use and can also provide power to recharge the batteries of portable wireless audio devices 110 as discussed below.

According to some embodiments, each individual portable wireless audio device 110 can include a device body 10, a wingtip anchor 20 for anchoring the device 10 in the user's ear, and an ear tip 30 attached at one end of the device body to acoustically seal within the user's ear canal. The device body 10 is defined by an outer housing 11 that can be formed of a monolithic outer structure and can include a nozzle (not visible in FIG. 1) defining the acoustic port to which ear tip 30 can be removably attached. In some embodiments, housing 11 defines an acoustic port or channel through the nozzle that directs sound from an internal audio driver out of housing, through ear tip 30 and into a user's auditory canal. Ear tip 30 can be a deformable ear tip that can be inserted into a user's ear canal creating a seal within the user's ear canal and enabling the wireless audio devices 110 to have a noise canceling feature as described below.

As will be appreciated herein, portable wireless audio devices 110 can be sufficiently small and light that the devices to be comfortably worn by a user for extended periods of time and even all day. The wireless audio devices 110 can provide an audio interface to host device 130 so that the user may not need to utilize a graphical interface of host device 130. In other words, wireless audio devices 110 can be sufficiently sophisticated that they can enable the user to perform certain day-to-day operations from host device 130 solely through interactions with wireless audio devices 110. This can create further independence from host device 130 by not requiring the user to physically interact with, and/or look at the display screen of, host device 130, especially when the functionality of wireless audio devices 110 is combined with the voice control capabilities of host device 130. Thus, wireless audio devices 110 can enable a true hands free experience for the user.

In some embodiments user input to wireless audio devices 110, and thus to host device 130, can be realized through one or more microphones (not shown in FIG. 1) and/or a multifunction button (not shown in FIG. 1). In some embodiments, the multi-function button is actuated by pressing against the wingtip anchor on the earbud device. The multifunction button can be, for example, a rocker switch disposed in the earbud device body underlying the wingtip anchor and the base portion of the wingtip anchor acts as a faceplate of the button so that contacting the wingtip actuates the rocker switch. In some embodiments, the rocker switch allows a user to input different commands based on the location on the wingtip where the user presses and the duration for which the multifunction button is depressed.

The earbud device body also includes electrical contacts 12 disposed along an exterior surface of the housing for making contact with corresponding electrical contacts in charging case 120. In some embodiments contacts, 12 can be flush with an exterior surface of housing and tightly sealed with the housing to prevent moisture or particles from entering the housing through the openings for the contacts.

Example Audio Device

Figure 2:
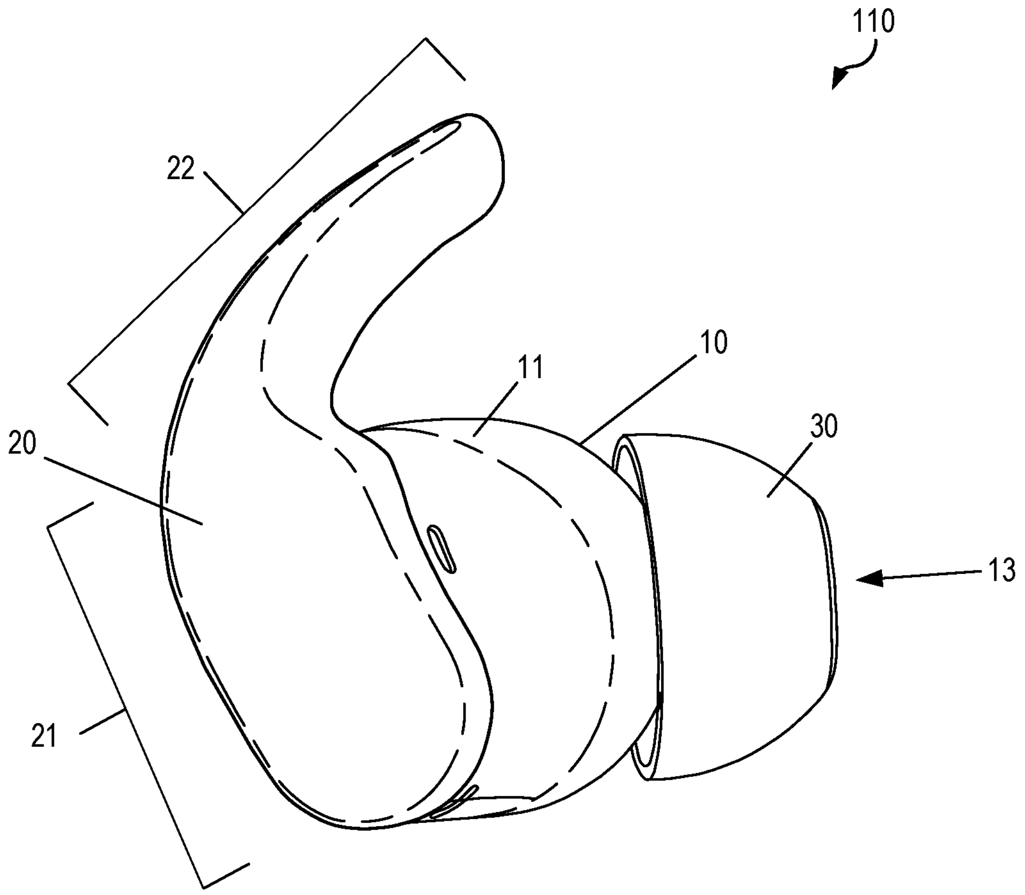
FIG. 2 is an exemplary audio device according to some embodiments.

FIG. 2 is an example portable audio device 110 in accordance with some embodiments. Portable audio device 110 includes a device body 10 defined by outer housing 11 that includes a nozzle 13 defining optical port at which the ear tip 30 is attached. The outer housing 11 is typically formed of a rigid polymer shell and is contoured to fit within the lower concha of the user's ear (see anatomy of human ear in FIG. 3). Wingtip anchor 20 is attached to the outer facing surface of the device body 11 when worn by the user (see FIG. 4). The wingtip anchor 20 includes a lower base portion 21 that is attached to the device body 11 and an upper protruding portion 22 that extends upwardly so as to enter the upper concha of the user's ear and engage the lower crura of the user's ear so as to act like a spring exerting an inwardly directed force to the base portion to secure the device body 11 in the lower concha with the nozzle securely sealed by the ear tip 30 within the user's auditory canal.

Portable wireless audio device 110 includes various internal components (not shown) configured to perform its audio function and associated control capabilities (see FIG. 21). For example, the earbud device body can include a computing system that executes computer-readable instructions stored in a memory bank for performing various functions of the portable wireless audio device. Computing system can be one or more suitable computing devices, such as microprocessors, computer processing units (CPUs), digital signal processing units (DSPs), field programmable gate arrays (FPGAs), application specific integrated circuits (ASICs) and the like. Computing system can be operatively coupled to a user interface system, communication system, and a sensor system for enabling portable wireless audio device to perform one or more functions. For instance, user interface system can include a driver (e.g., speaker) for outputting sound to a user, one or more microphones for inputting sound from the environment or the user, one or more LEDs for providing visual notifications to a user, a pressure sensor or a touch sensor (e.g., a resistive or capacitive touch sensor) for receiving user input, and/or any other suitable input or output device. In some embodiments, user interface can include a multifunction button, (see FIGS. 5A and 16-24C) as discussed in further detail below.

Communication system can include wireless and wired communication components for enabling portable wireless audio device 110 to send and receive data/commands from host device 130. For example, in some embodiments communication system can include circuitry that enables portable wireless audio device 110 to communicate with host device 130 over wireless link 131 via a Bluetooth or other wireless communication protocol. In some embodiments communication system can also enable portable wireless audio device 110 to wirelessly communicate with charging case 120 via wireless link 133. Sensor system can include optical sensors, accelerometers, microphones, and any other type of sensor that can measure a parameter of an external entity and/or environment.

Portable wireless audio device 110 can also include a battery, which can be any suitable energy storage device, such as a lithium ion battery, capable of storing energy and discharging stored energy to operate the audio device. The discharged energy can be used to power the electrical components of portable wireless audio device. In some embodiments, the battery can be a rechargeable battery that enables the battery to be repeatedly charged as needed to replenish its stored energy. For instance, battery can be coupled to battery charging circuitry (not shown) that is operatively coupled to receive power from a charging case interface. Case interface can, in turn, electrically couple with PWLD interface of charging case 120. In some embodiments, power can be received by electrical contacts from charging case 120 via electrical contacts within case interface (e.g., contacts 12 at an exterior surface of audio device 110). In some embodiments, power can be wirelessly received by portable wireless audio device 110 via a wireless power receiving coil within the charging case 120.

Figure 3:
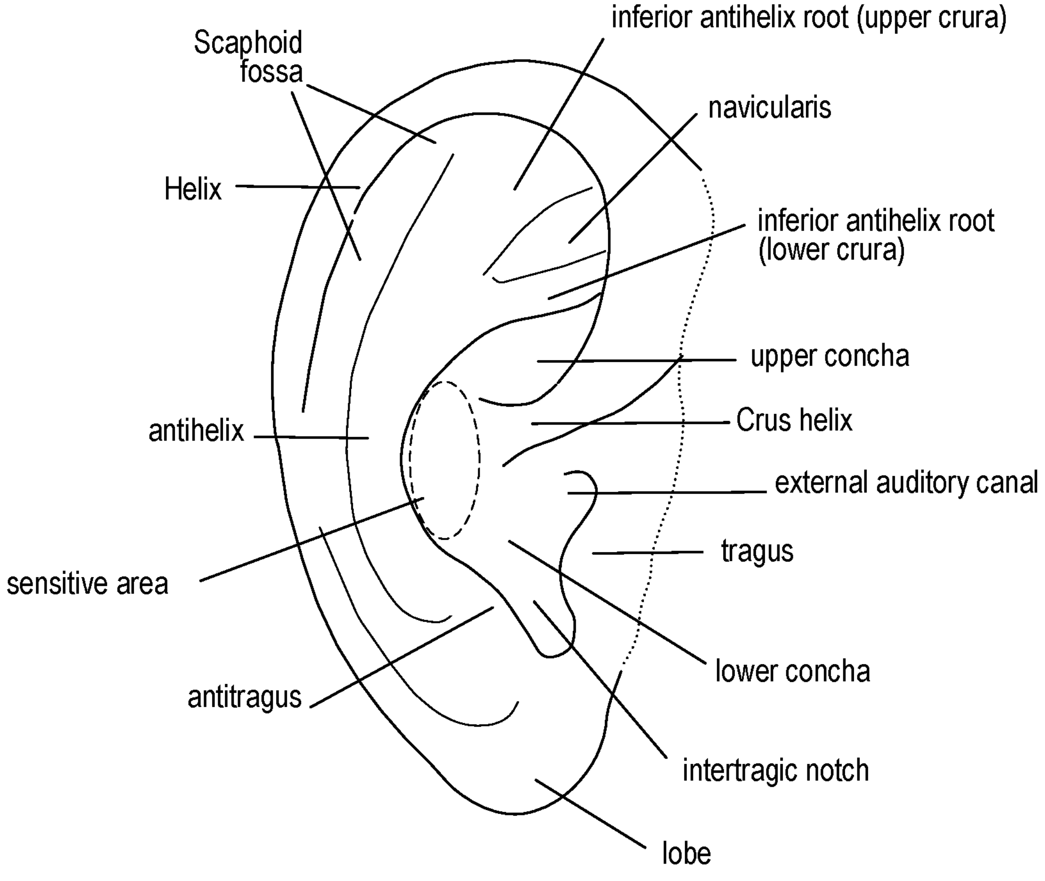
FIG. 3 is the anatomy of the human ear.

FIG. 3 illustrates the anatomy of the human ear. As shown, the external auditory canal through which a person receives sound is within a large lower recessed area known as the lower concha. This recessed area then winds rearward and upward through a narrowed region into the upper recessed area known as the upper concha. This narrowed region is sensitive as compared to other regions of the outer ear and is bounded in the rearward direction by the antihelix. The upper and lower concha are separated by a raised feature known as the crus helix, which extends upward into the helix and outer rim of the ear. Another raised feature in the interior of the ear, the lower crura or inferior antihelix root, above the upper concha, extends into the antihelix.

As can be seen in FIG. 3, the anatomy of the human ear is complex. Many earlier earbud designs, mostly wired designs, were relatively small and resided within the lower concha without any additional anchoring support. However, as ear buds increased in sound quality and functionality, ear buds increased in size and weight. Accordingly, more recent earbud designs include various anchoring features. Typically, these anchoring features are flexible protruding portions that extend within a common vertical plane as the earbud and wind through the curved recessed portion of the ear extending from the lower concha to the upper concha, including the sensitive region. While such designs do provide improved anchoring for many users, there are a number of challenges. Foremost, the size and shape of user's ears vary considerably from person to person. Therefore, a curved anchoring feature that fits smaller ears, is unlikely to fit larger ears. For this reason, many conventional earbud designs utilize removable anchoring portions that allow the user to attach differing sizes and shapes of anchors. While this approach is somewhat successful, it presents additional challenges to the user in determining the proper size anchor. Since ear sizes vary considerably, there is often uncertainty as to what size anchor corresponds to a user's ear. Moreover, in the process of determining what size and shape of anchor is most suitable, the removable anchors can be lost. Further, since the standard wingtip designs curve through the narrowed sensitive area between the lower and upper concha, this can cause the earbud to be more noticeable and uncomfortable when worn for any length of time. The improved wingtip anchor design described herein overcomes these challenges as follows.

Figure 4:
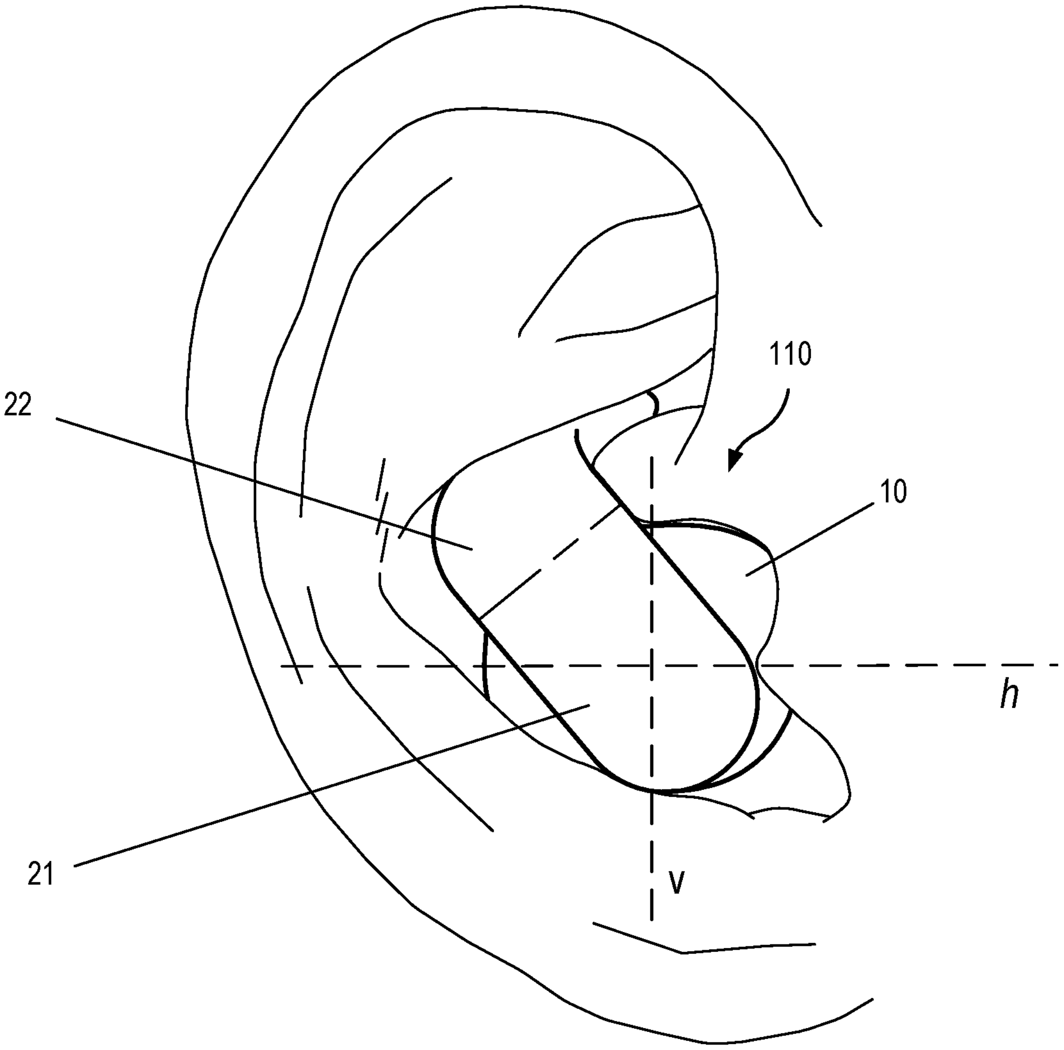
FIG. 4 is the exemplary audio device of FIG. 2 worn in a user's ear.

FIG. 4 shows the example earbud device 110 of FIG. 2 when worn within a user's ear. As shown, the device body 10 is contoured and shaped to reside primarily within the lower concha (although an outer facing portion of the device may protrude out from the lower concha). In this embodiment, the device body 10 is elongate along the horizontal axis, h, and substantially fills the entire lower concha such that the device body itself provides some anchoring by its engagement with the protruding features of the ear surrounding the lower concha. The wingtip anchor 20 extends from the device body and protrudes in a vertical direction to engage the upper concha of the ear. As can be seen in FIG. 4, the wingtip base portion 21 is attached to the device body 10 along its outer facing side. Base portion 21 extends in a rearward direction and supports protruding portion 22, which extends rearward over the crus helix, then curves or angles in a forward direction and also in an inward direction so that a distal end of the protruding portion 22 enters the upper concha and engages against the lower crura above the upper concha. In this embodiment, protruding portion has a partly flattened outer surface to facilitate engagement with the lower crura.

While the device body housing is of a generally rigid construction, such as hard plastic, the wingtip anchor has a more flexible construction, such as a silicone polymer of a durometer between 40 and 60 on the Shore scale, typically 50 Shore A. Additionally, the reduced dimensions and distal tapering of the wingtip portion allow for flexibility, particularly along the distal portion that engages the lower crura. This flexibility allows the wingtip to engage against the lower crura and flex slightly, which acts as a spring exerting an inwardly directed force on the outer facing side of the earbud toward the user, which secures the earbud within the ear. This flexibility also provides improved user comfort and maintains the anchoring force during movements of the active user.

Figure 5A:
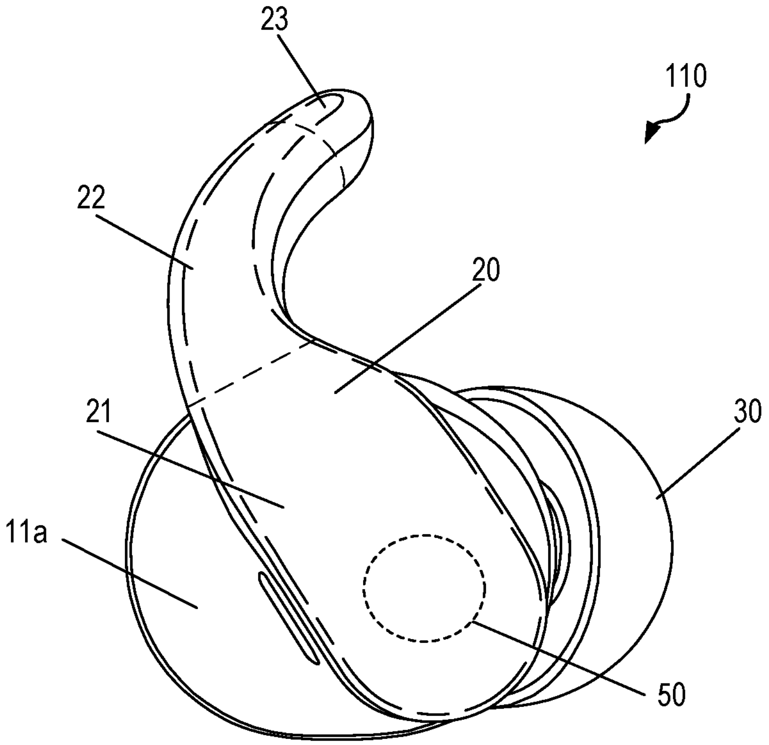
FIGS. 5A and 5B are views of the outer facing side and the inner facing side of the audio device according to some embodiments.
Figure 5B:
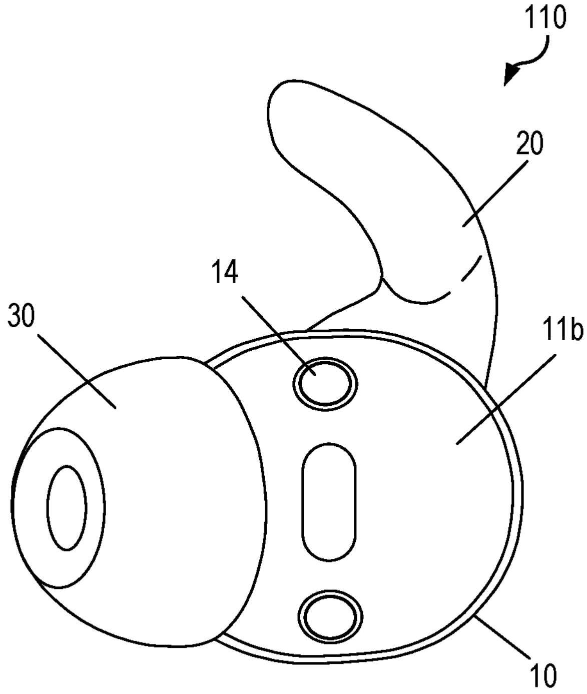

FIGS. 5A and 5B are views of the outer facing side and the inner facing side of the example audio device 110. As can be seen, the audio device body 110 has a generally bulbous shape and is elongated along the horizontal axis (see FIG. 4). This shape generally corresponds to the shape and size of the lower concha so that the device body substantially fills the lower concha. As shown in FIG. 5A, the wingtip anchor 20 extends from the outer facing side 11*a* of the device body 10 and extends vertically upwards so as to engage the upper concha when worn. The wingtip anchor 20 includes a base portion 21 that extends across a majority of the outer face 11*a* of the device body 11. The base portion 21 extends in a generally rearward and upward direction to the protruding portion 22, which extends further upward and rearward before curving or angling in a forward and upward direction. This shape allows the wingtip anchor 20 to extend over the protruding crus helix before the distal portion 22 enters the upper concha. The protruding portion also tapers distally to the distal portion 22 that engages which engages the lower crura. Typically, these different portions of the wingtip are all part of the same unitary component or formed of the same material. In other embodiments, the wingtip could be formed of multiple components of differing materials or material properties. The earbud device can further include an integrated multi-function button 50 (area shown in dashed) such that depressing the indicated area of the wingtip base portion 21 actuates functionality of the earbud device 110.

Figure 6A:
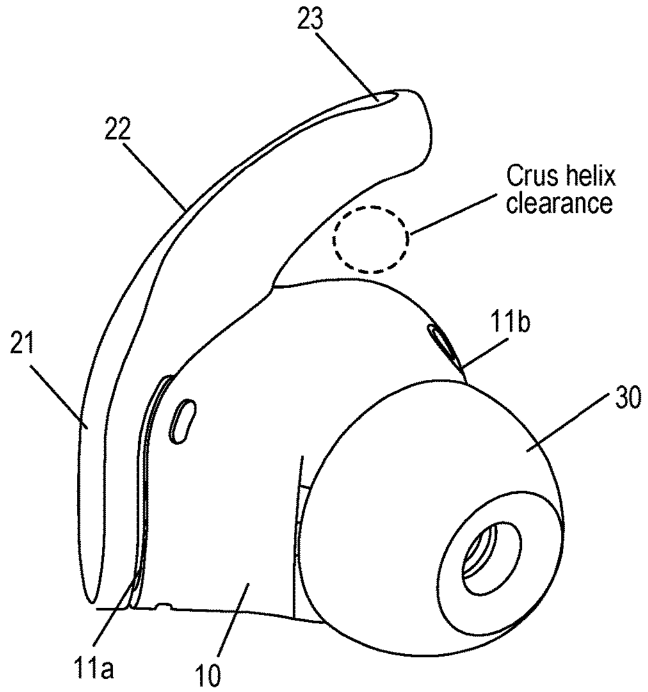
FIGS. 6A and 6B are views of the front facing side and the rearward facing side of the audio device according to some embodiments.
Figure 6B:
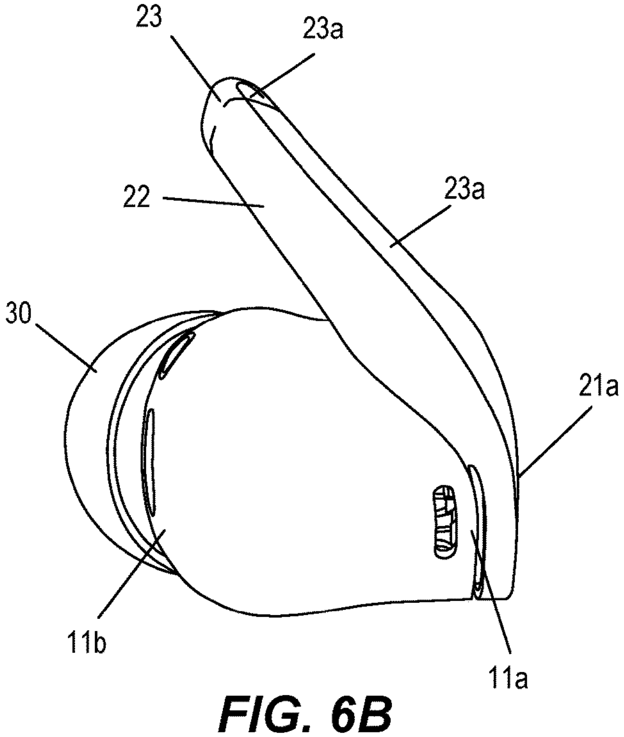
Figure 7A:
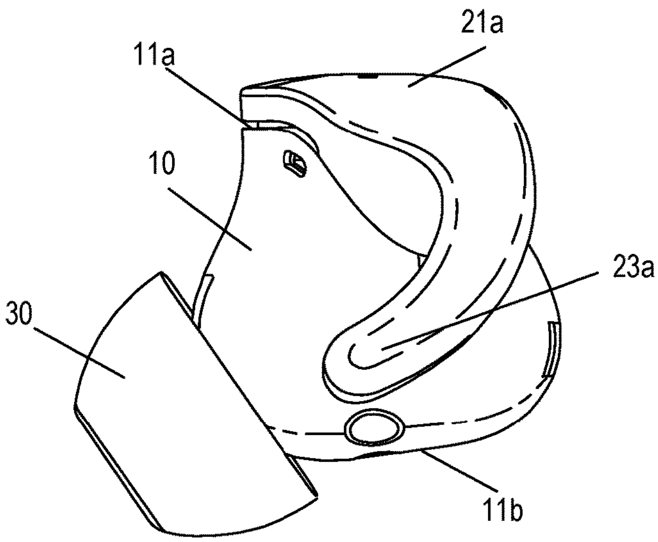
FIGS. 7A and 7B are top view and bottom views of the audio device according to some embodiments.
Figure 7B:
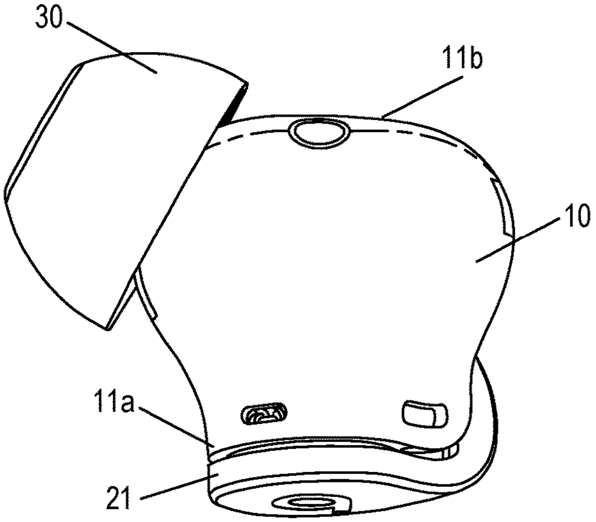

FIGS. 6A and 6B are front facing side and the rearward facing side views, respectively, of the example audio device 110 in FIG. 2. As can be seen in FIG. 6A, the wingtip base portion 21 is a relatively thin, flat faceplate that covers a majority of the outer facing side 11*a* of the device body 11. In this embodiment, the outer facing side 11*a* of the device body is protruding in the outward direction from the lower concha such that extending the wingtip anchor from this outer facing side upwards and angling or curving the distal protruding portion 22 in the inward direction allows the protruding portion 22 to extend over the crus helix and into the upper concha without engaging a majority of the narrowed sensitive region between the concha. As can be seen in FIG. 6A, the inward angle of the protruding wingtip portion is angled so as to provide sufficient clearance over the crus helix. FIG. 6A shows the same features and inward projection of the wingtip portion from the rear facing side. As can be seen in FIG. 6B, the outer facing surfaces of the wingtip portion includes flattened, planar regions. The flattened, planar region 21*a* on the base portion acts as a faceplate to facilitate manually pressing on the base portion by the user to actuate the underlying or integrated multi-function button. The flattened portions 23*a* on distal portion 23, facilitates engagement with the lower crura. These same features can also be see on the FIGS. 7A and 7B, which are views of the front facing side and the rearward facing side of the audio device, respectively. Additionally, the bulbous, elongated shape of the body device 11 and its projection to the outer facing surface 11*a*, can be more clearly seen in FIGS. 7A-7B.

Figure 8A:
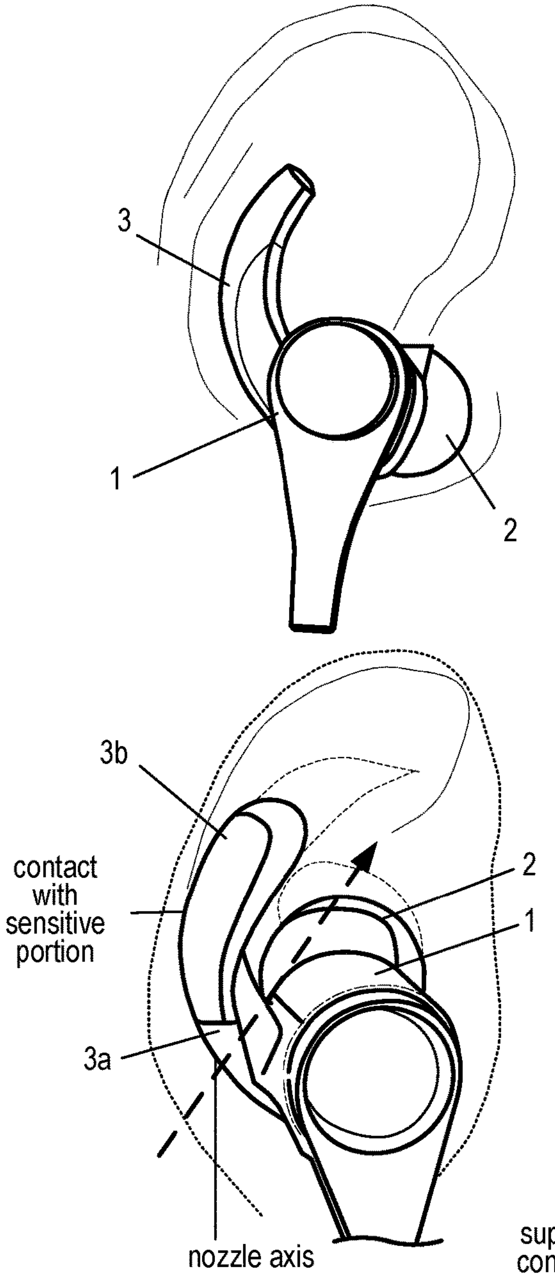
FIG. 8A (Prior Art)
FIGS. 8A and 8B depict a conventional earbud design worn in the ear of a user.
Figure 8B:
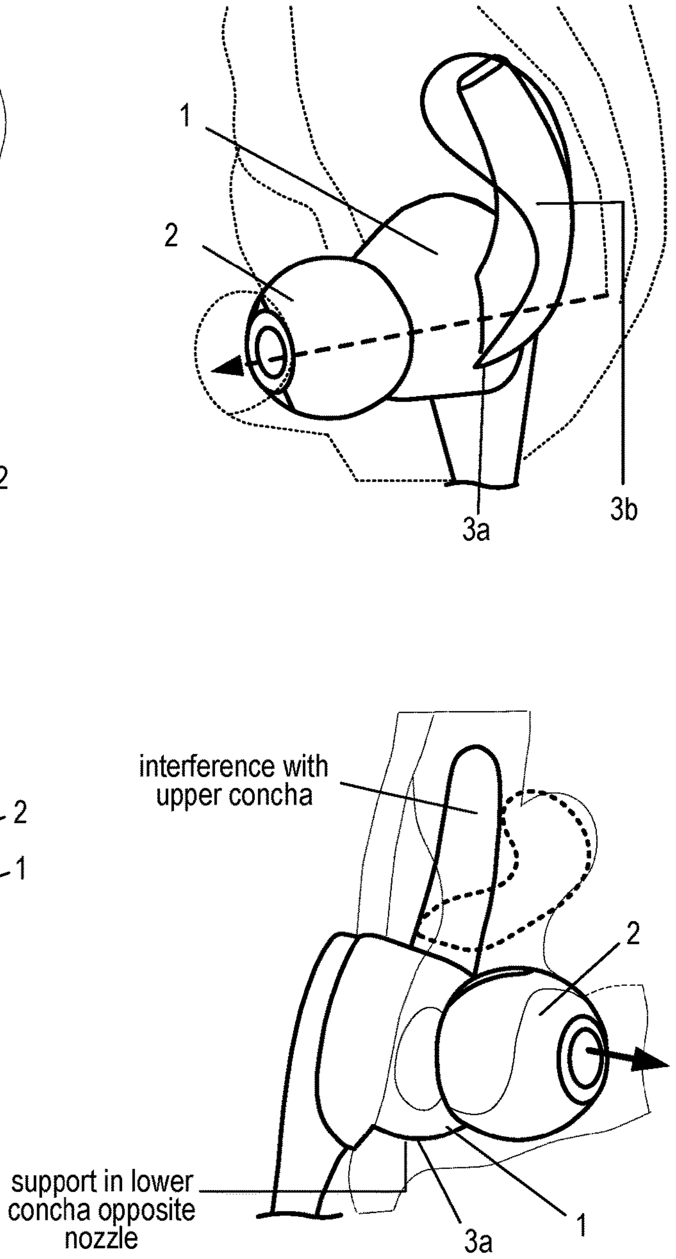
FIG. 8B (Prior Art)

FIGS. 8A and 8B depict a conventional earbud design when worn in the ear of a user. This conventional design is for hardwired earbuds that include an earbud device body 1, an eartip 2 disposed over the nozzle having the audio port, and wingtip anchor 3 extending from the device body 1.

Accordingly, the earbud device body 1 is rounded and relatively small such that it does not substantially fill the lower concha. To provide suitable anchoring, the design must rely, at least partly, on the wingtip base potion 3*a* disposed opposite the ear tip 2 along the nozzle axis. Accordingly, the base portion 3*a* must extend from the rearward side of the device body, to engage the rear portion of the lower concha. The wingtip anchor 3 then extends upwards and an intermediate portion engages the sensitive region between conchas and a distal portion 3*b* extends into the upper concha. As shown, when in a non-displaced configuration, the wingtip portion extends through a common vertical plane in alignment with the earbud device body. Thus, this design cannot provide the inwardly directed spring force provided by the improved design discussed previously, but rather relies primarily on an interference fit along the curved recessed portions of the ear to provide anchoring. This interference fit approach provides more force along more features of the ear, which can potentially reduce comfort and wearability for some users. Further, as this design engages along the curved portion of the ear between conchas, it can be less accommodating to ears of differing sizes, particularly larger and smaller than average ear volumes. As can be seen in FIG. 8B, in smaller ears, distal portion 3*c* may interfere with the lower crura of the upper concha, which complicates its use and may reduce user comfort.

Figure 9A:
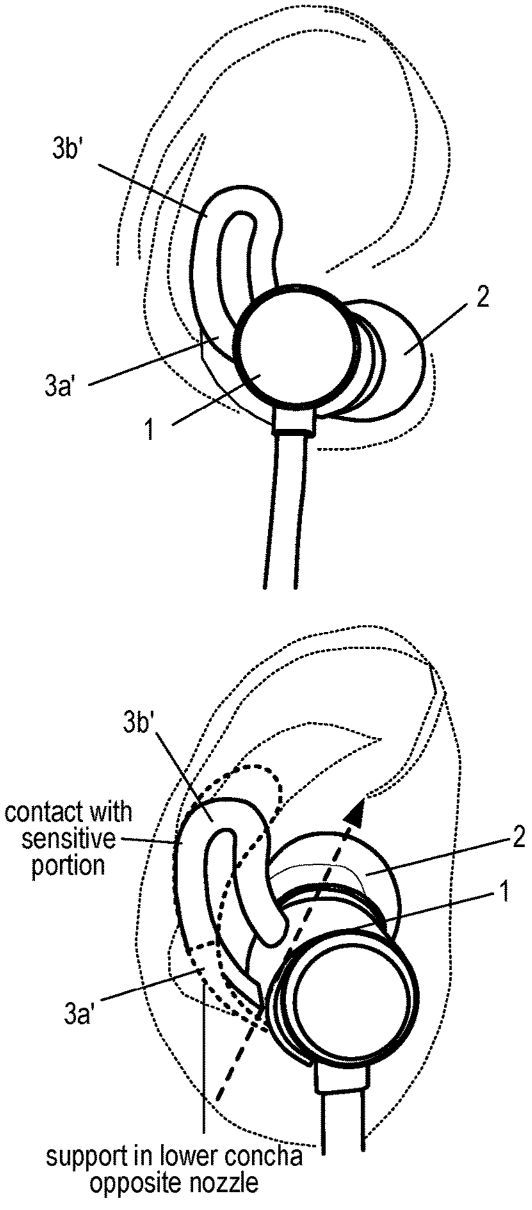
FIG. 9A (Prior Art)
FIGS. 9A and 9B depict another conventional earbud design worn in the ear of a user.
Figure 9B:
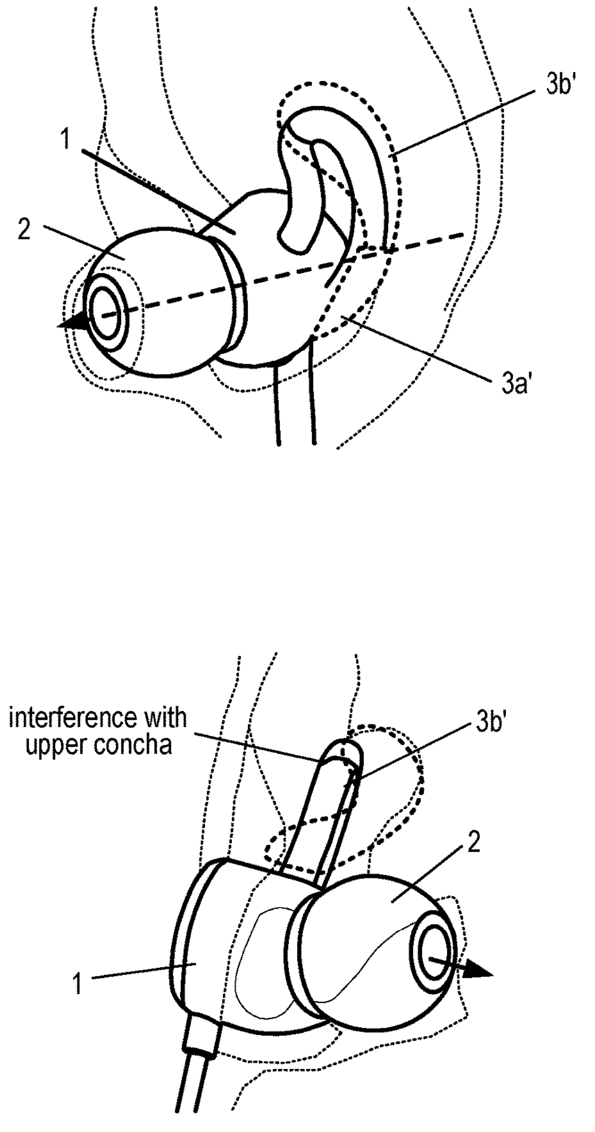
FIG. 9B (Prior Art)

FIGS. 9A and 9B depict another conventional earbud design worn in the ear of a user. Similar to the design in FIGS. 8A-8B, the earbud device is a hardwired earbud such that the body 1 is rounded and relatively small and does not substantially fill the entire lower concha. The design relies, at least partly, on the wingtip base portion 3*a*' engaging the rearward portion of the lower concha while the protruding portion 3*b*' extends along the sensitive area and only partly into the upper concha. This wingtip design relies partly on engagement of the protruding portion 3*b*' with the rear portion of the recessed features of the ear, which may differ considerably between ears of differing sizes and shapes. Accordingly, each of these wingtip designs can be removable from the device body by the user, to allow replacement with differing wingtip anchors of differing sizes and shapes.

Figure 10:
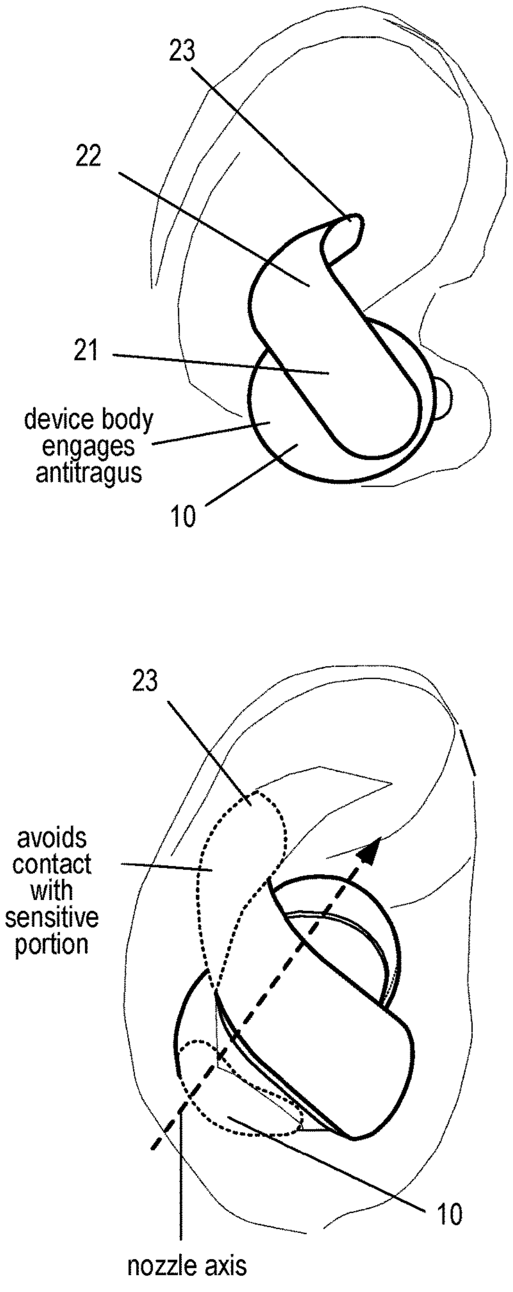
FIGS. 10 and 11 depict an exemplary earbud wingtip design, in accordance with some embodiments, worn in the ear of a user.
Figure 11:
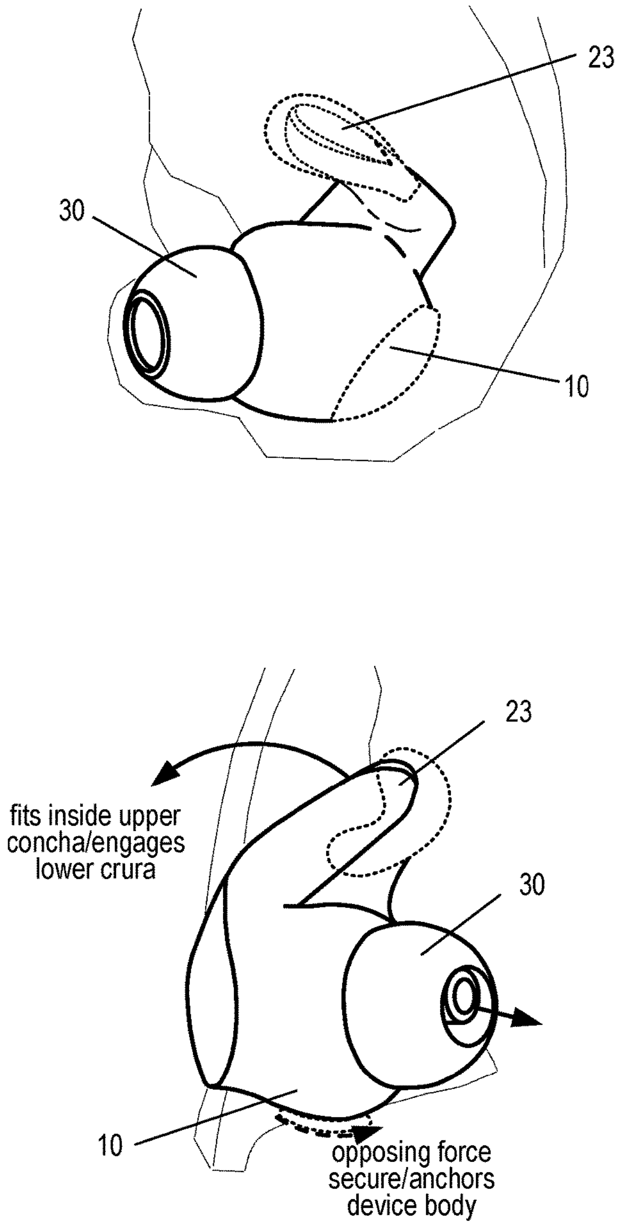

FIGS. 10 and 11 depict the exemplary earbud device of FIG. 2 when worn in the ear of a user. As can be seen in FIGS. 10 and 1, the device body 10 is an elongated bulbous shape that substantially fills the lower concha such that the rear portion of the device body 10 itself engages the antitragus along the rear of the lower concha (which is opposite the nozzle along the nozzle axis) so that the device body itself provides some anchoring within the lower concha. The wingtip base portion 21 extends from the outer facing surface 11*a*, angles rearward and upward, substantially avoiding the intermediate sensitive area of the recessed portion of the ear, then curves or angles in both the forward and inward directions so that the distal portion 23 enters the upper concha and engages the lower cruras. As shown in the lower figure of FIG. 11, the distal portion 23 enters the upper concha and engages against the downward facing surface of the lower cruras such that the force applied against the lower cruras (solid arrow) causes an opposing force through the wingtip anchor in an inward direction (dashed arrow), thereby securing the device body within the ear and the eartip 30 sealingly engaged with the auditory canal of the ear.

Since conventional wingtip designs extend largely in-plane and engage a set curvature of the recessed portion of the ear, a given wingtip provided insufficient anchoring in larger concha ear volumes and tend not to fit within smaller concha ear volumes. As a result, these conventional devices typically require either selection of a certain device size or interchanging between differing sizes of wingtips to accommodate a user's ear size. In contrast, since the wingtip anchor described herein does not rely on continuous engagement of the inner curvature of the recessed portion of the ear, but rather extends from the outer face of the earbud device then angles or curves over the crus helix and into the upper concha, this design fits various differing sizes and shapes of ears, including ears with smaller and larger than average concha volumes, in substantially the same manner so as to provide improve anchoring and user comfort.

Figure 12:
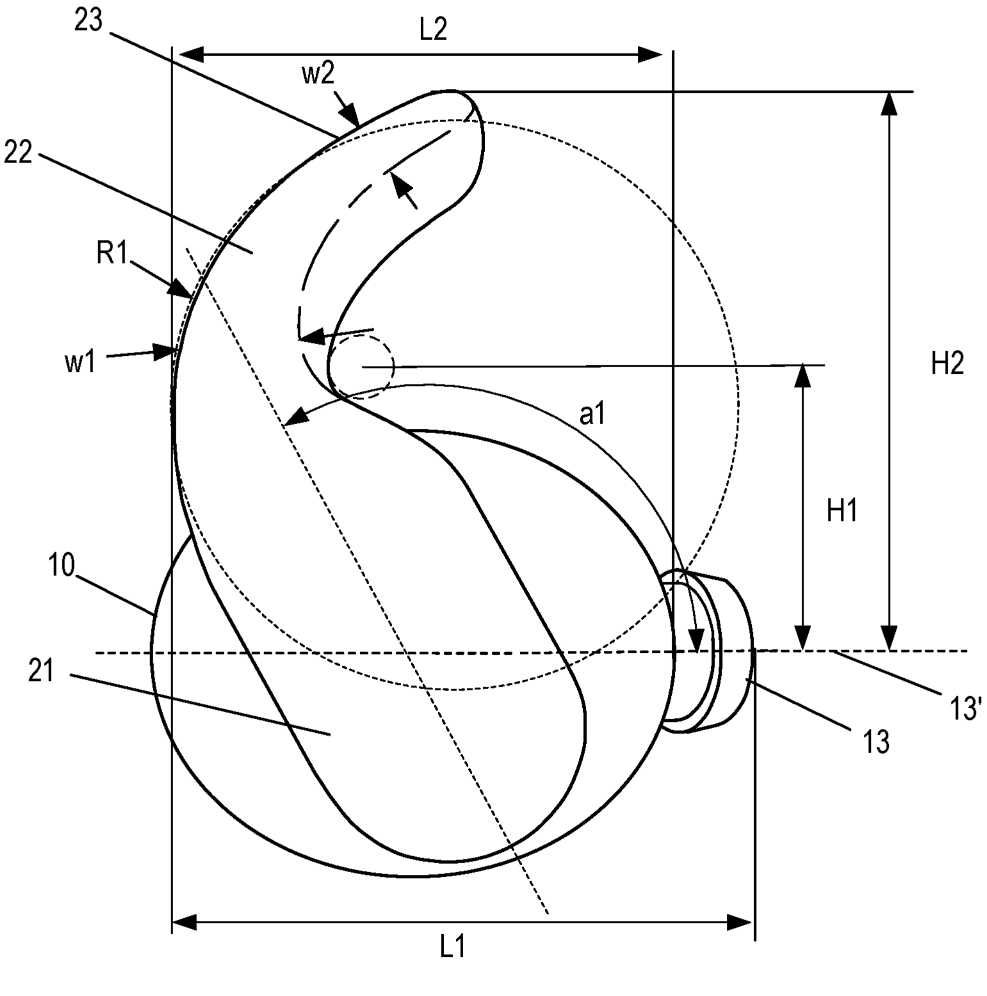
FIG. 12 depicts various dimensional aspects of the exemplary earbud design in accordance with some embodiments.
Figure 13:
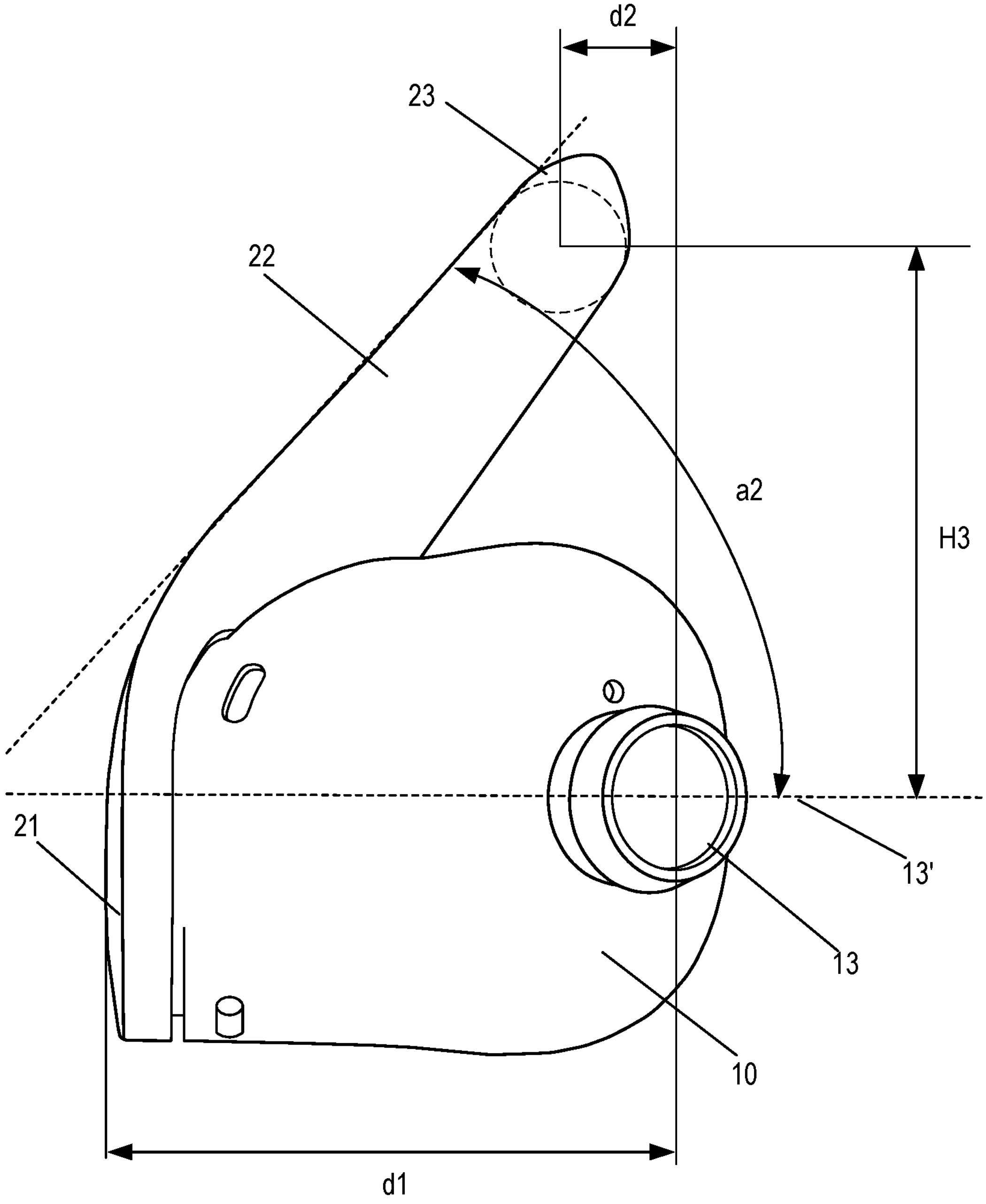
FIG. 13 depicts various dimensional aspects of the exemplary earbud design in accordance with some embodiments.

FIGS. 12-13 depicts various dimensional aspects of the example earbud design in FIG. 2. The various dimensions noted are particularly advantageous in providing satisfactory fit and anchoring within a wide range of ear concha volumes (e.g. a one-size-fits-all, universal design). Although these dimensions are typical of the exemplary embodiment, it is appreciated that various other designs may be utilize various other dimensions and still be in keeping with the inventive concepts described herein.

As shown in FIG. 12, in this embodiment, the length L1 of the elongate device body between the vertical planes along the most rearward surface and the most forward surface of the audio nozzle 13 is between 15 and 25 mm, typically between 18 and 22, preferably about 21 mm. The height H1 between horizontal planes along nozzle axis 13' passing longitudinally through the center of the audio channel of the nozzle 13 and at the point of most rearward extension of the wingtip anchor 20 is between 5 and 15 mm, typically between 7 and 11 mm, preferably about 10 mm. The height H2 between the horizontal planes along nozzle axis 13' and the highest point of wingtip anchor 20 is between 15 and 25 mm, typically between 18 and 22, preferably about 20 mm. The greatest length L2 of the earbud device body 10 along a plane parallel to its outer facing surface is between 10 and 25 mm, typically between 15 and 20 mm, preferably about 18 mm. The rearward extension angle a1 of wingtip anchor 20 from the base portion 21 relative a horizontal plane extending along nozzle axis 13' is between 110 and 130 degrees, typically about 115 and 125 degrees, preferably about 120 degrees. The width w1 of the lower portion of the projection portion 22 of wingtip anchor 20 is between 2 and 7 mm, typically between 2 and 5 mm, preferably about 4.5 mm. The projection portion distally tapers such that the width w2 of the distal portion 23 is between 2 and 6 mm, typically between 2 and 4 mm, preferably about 3.5 mm. The radius of curvature R1 of the outer facing surface of the wingtip anchor 20 is between 15 and 25 mm, typically between 18 and 22 mm, preferably about 20 mm.

As shown in FIG. 13, in this embodiment, the horizontal distance d1 between the audio nozzle 13 of the device body and wingtip base portion 21 is at least 10 mm, typically between 10 mm and 18 mm, preferably about 14 mm. The inward angle a2 between the protruding portion 22 of wingtip anchor 20 and the horizontal plane along nozzle axis 13' is between 30 and 60 degrees, typically between 40-50 degree, preferably about 48 degrees. The vertical distance H3 between the distal tip 23 of wingtip anchor 20 and the horizontal plane along nozzle axis 13' is between 10 and 25 mm, typically between 25 and 20, preferably about 17 mm. The horizontal distance d2 between the distal tip 23 of the wingtip anchor 20 and a vertical plane extending through nozzle 13 is between 2 and 6 mm, typically between 2 and 5, preferably about 3.5 mm.

Figure 14A:
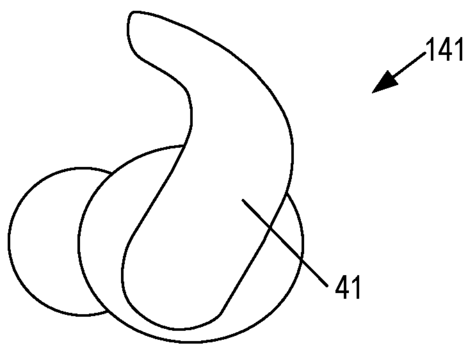
FIGS. 14A-14C depict alternative earbud designs in accordance with some embodiments.
Figure 14B:
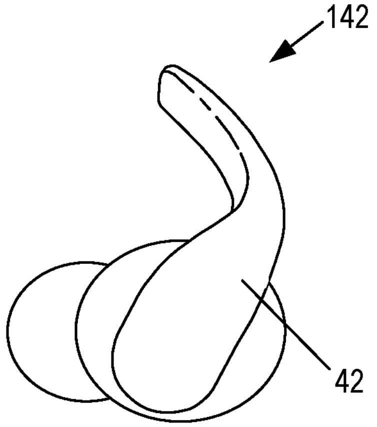
Figure 14C:
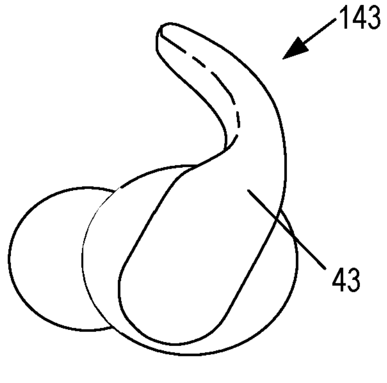

FIGS. 14A-14C depict alternative earbud designs in accordance with some embodiments. It is appreciated that these embodiments utilize similar concepts as those described above, but may include differing dimensions than those specified in the previous embodiments. FIG. 14A shows earbud design 141 having wingtip anchor 41 that is thicker in width than the embodiment of FIG. 2 such that the protruding portion may be less flexible. Some active users may prefer this design as it may provide higher, more consistent force on the lower crura and further improve anchoring. FIG. 14B shows earbud design 142 having wingtip anchor 42 that is larger and extends upwards. Some users at the higher end of the larger concha volumes may prefer this design as it may exert more force on the lower crura and further improve anchoring for larger ears. FIG. 14C shows earbud design 143 having wingtip anchor 43 that is shorter than previous embodiments. Some users at the lower end of smaller concha volumes may prefer this design as it may exert less force on the lower crura.

Figure 15A:
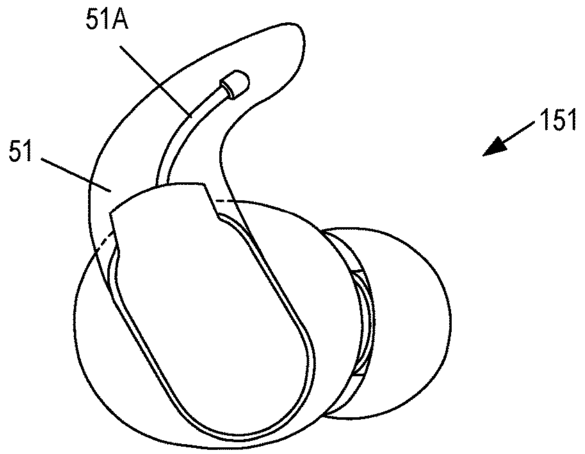
FIGS. 15A-15C depict alternative earbud designs in accordance with some embodiments.
Figure 15B:
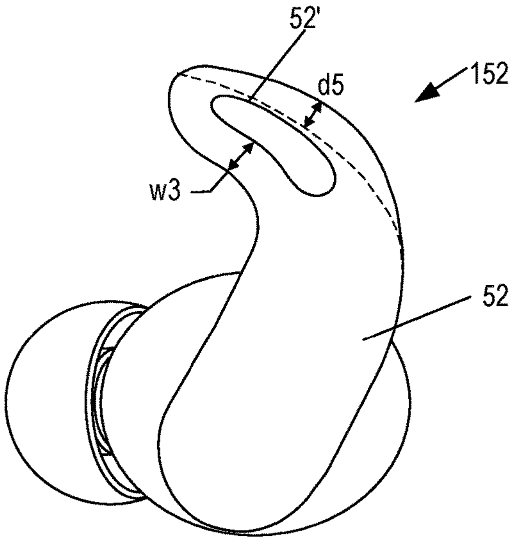
Figure 15C:
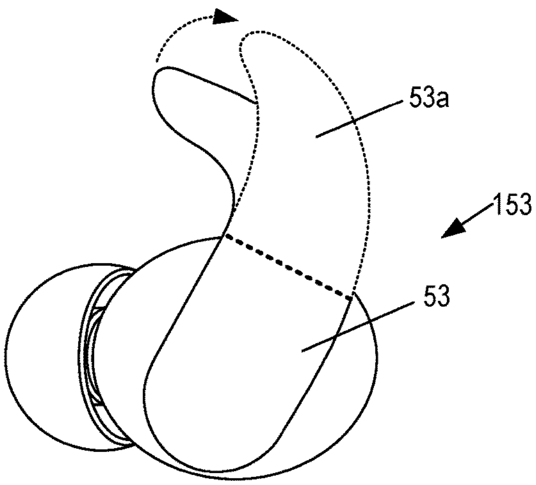

FIGS. 15A-15C depict additional alternative earbud designs in accordance with some embodiments. FIG. 15A shows earbud design 151 with a wingtip portion 51 similar to those previously described, however, the wingtip further includes a deflectable support wire **51*a* within that allows the user to adjust the shape and/or curvature of the wingtip projection to further improve comfort or anchoring. FIG. 15B shows earbud design 152 with a wingtip anchor 52 having a distal end with opening 52' such that the distal portion is collapsible. The width w3 of the material on either side of the opening 52' is about 2 mm, and the opening is about the same or greater width such that the total width of the distal end can collapse by a distance d5, which is between 1-3 mm, typically 2-2.5 mm. FIG. 15C shows earbud design 153 that has a wingtip anchor 53 with a movable distal end portion 53*a*** to allow the user to move distal end for improved anchoring or comfort. The distal end can be movably attached by a hinge, pivot, or any suitable means.

Figure 16:
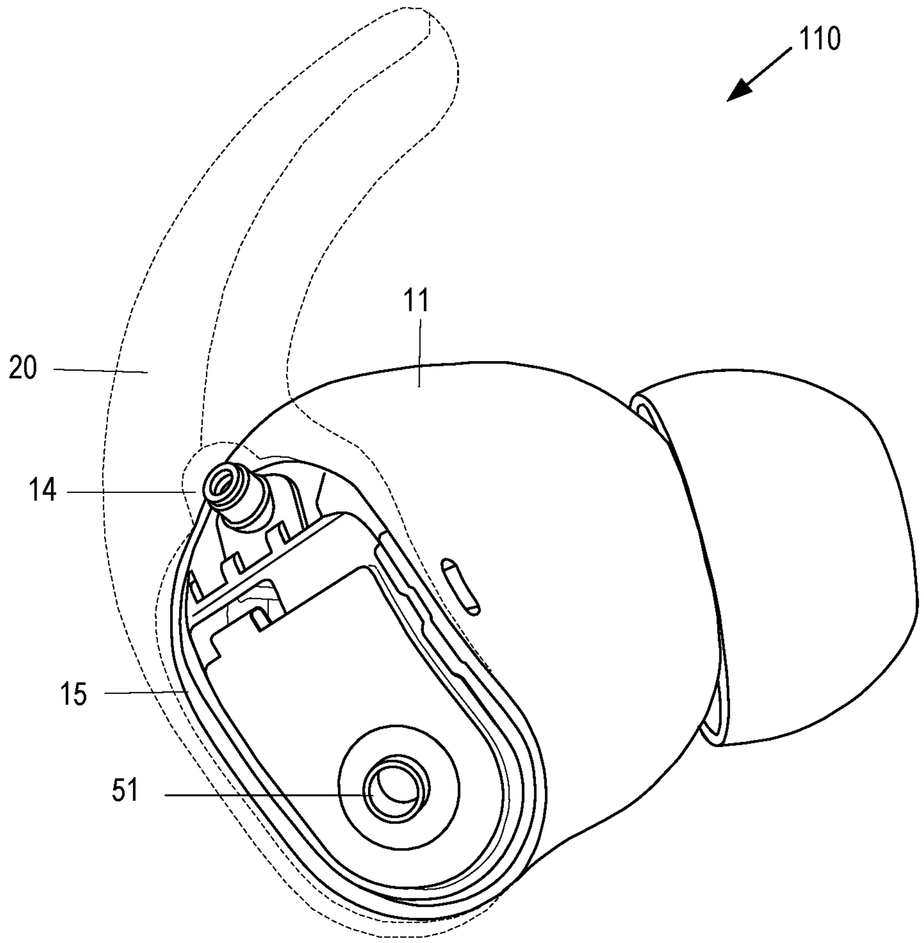
FIG. 16 depict shows the audio device with the wingtip transparent to show the interface between the wingtip anchor with device body and underlying components in accordance with some embodiments.

FIG. 16 depict shows additional details of the example earbud of FIG. 2, in particular, details of the attachment interface between wingtip anchor 20 and device body 10 as well as features of a multi-function button (the wingtip anchor 20 is transparent to better show underlying components). The wingtip anchor 20 includes a threaded insert 14 along an underside that receives a screw fed inside the housing 11 of the device body 10. The earbud includes an antenna 15 along the outer facing surface of the housing to facilitate wireless communication with an external device, such as case 120 or host device 130. The earbud body further includes in-molded plunger 51 that facilitates actuation of the multi-function button by pressing against the faceplate of the base portion 21 of wingtip anchor 20.

Figure 17:
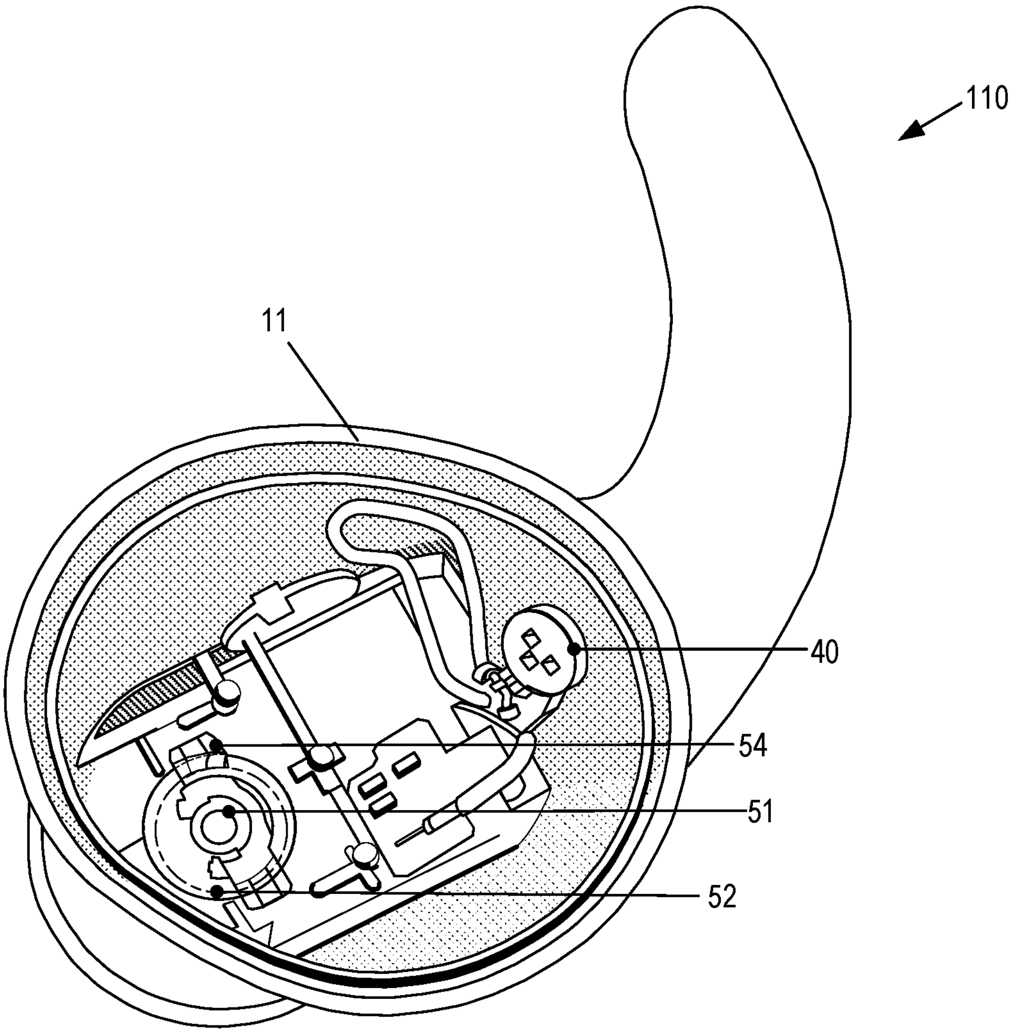
FIG. 17 shows an interior view of the device body that interfaces with the wingtip anchor in accordance with some embodiments.
Figure 18:
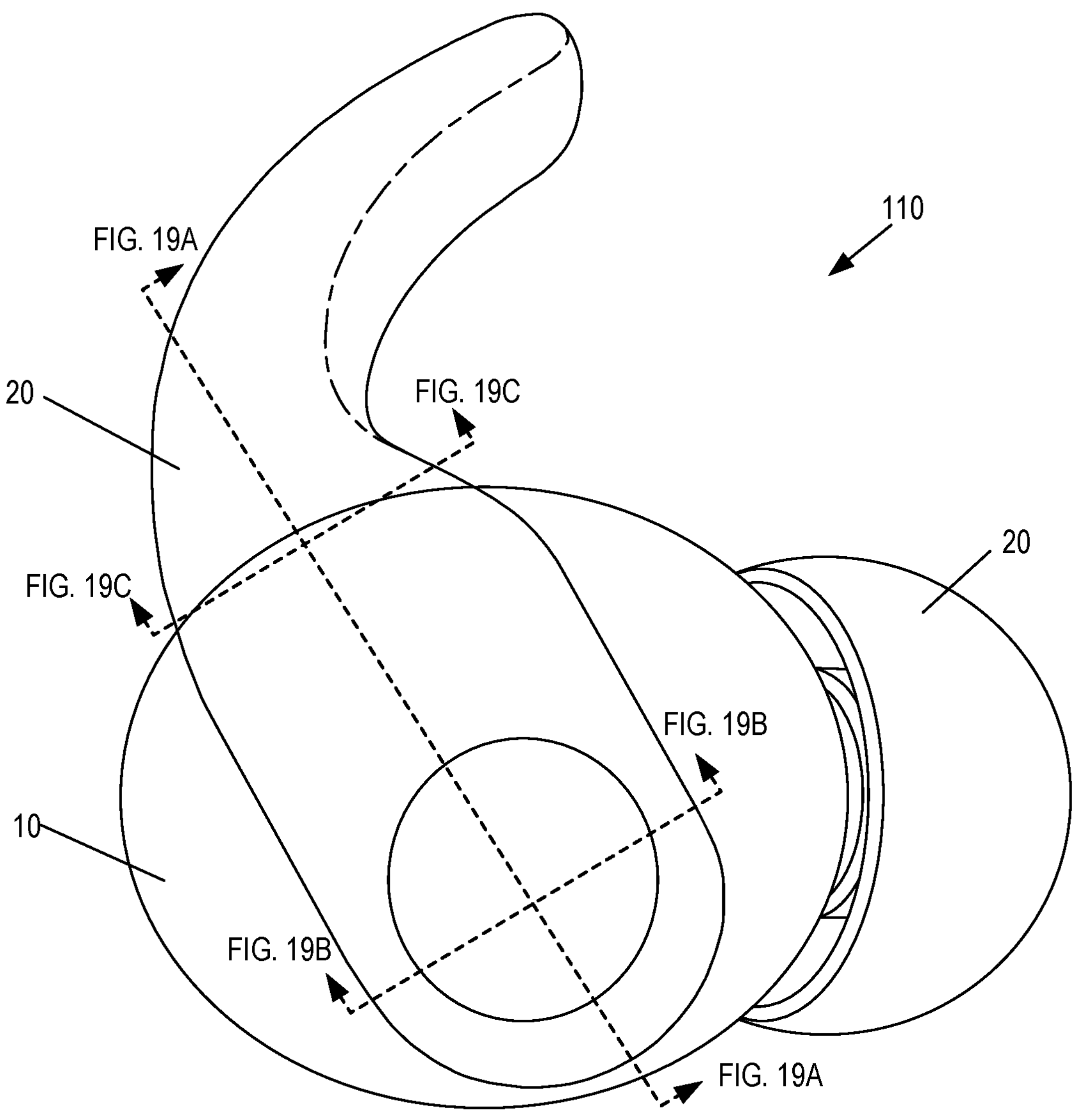
FIGS. 18 and 19A-19C show an example audio device and various partial cross-sectional views of the interior in accordance with some embodiments.

FIG. 17 show an interior view of the housing 11 of device body 10 and various internal components. Screw 40 extends through the threaded insert 14 and into the wingtip anchor 20 so as to secure wingtip anchor 20 to the device body 10. Plunger 51 is surrounded by a flexible gasket 51 that is fitted within an aperture in the housing. Gasket 51 is flexible so as to allow back-and-forth movement of the plunger to actuate the underlying switch. Retention clip 54 retains the gasket and plunger assembly and movement when depressed. The configuration and operation of the multi-function button is further described below.

Figure 19A:
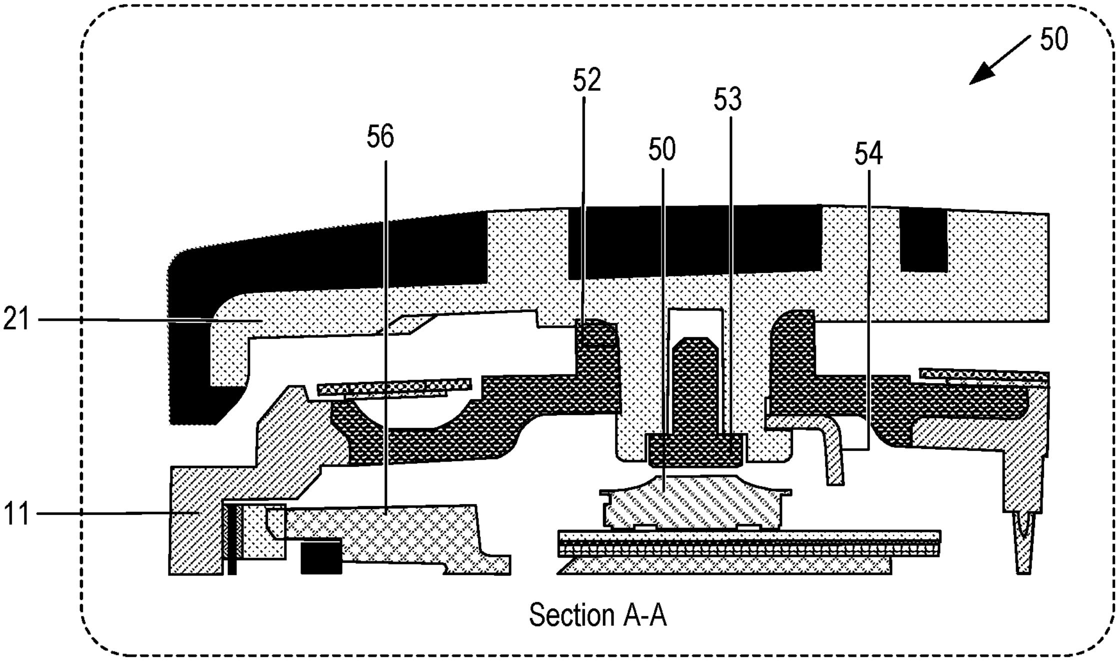
Figure 19B:
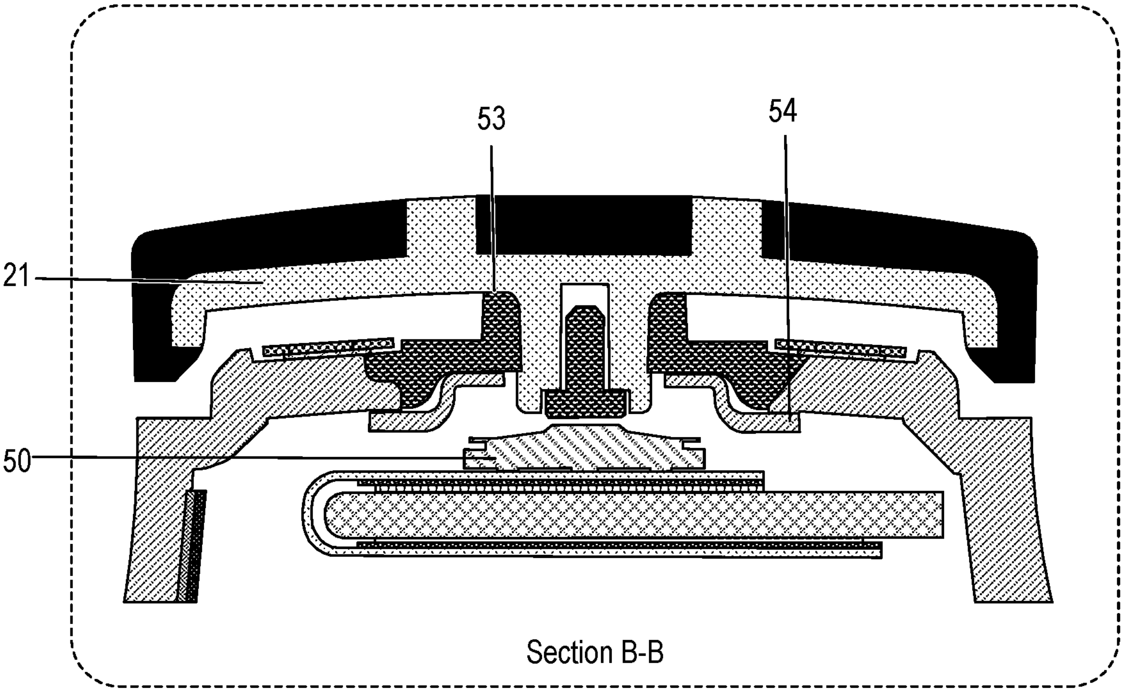
Figure 19C:
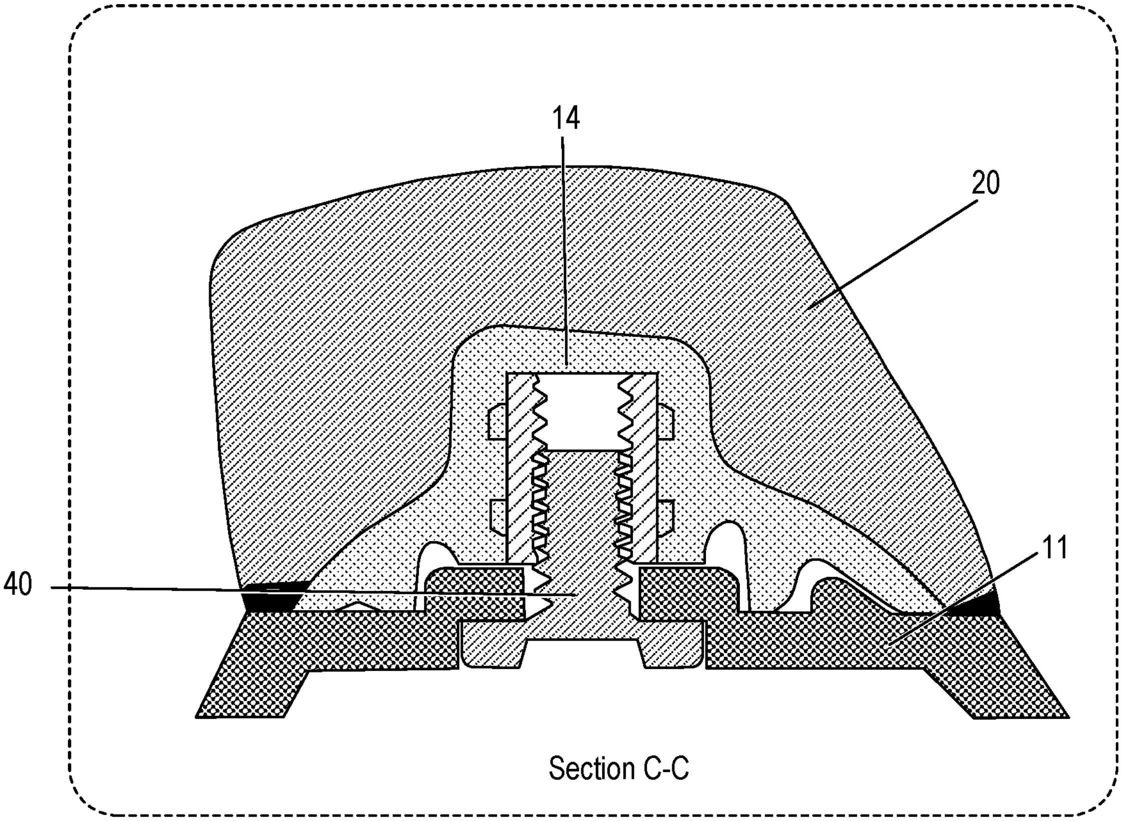
Figure 20:
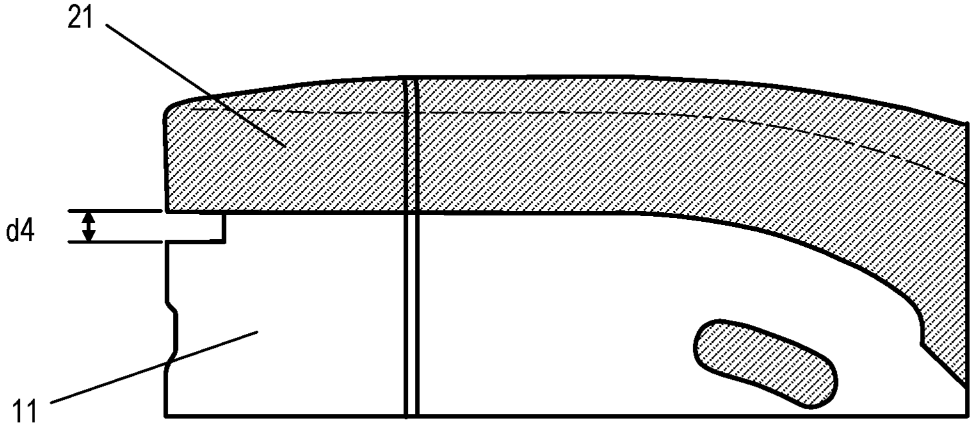
FIG. 20 shows an outside view of the interface between the wingtip anchor and the audio device body in accordance with some embodiments.

FIGS. 18 and 19A-19C show various cross-sectional view of the interior of the device body 10 that interfaces with the wingtip anchor 20 in accordance with some embodiments. Cross-sectional views A-A and B-B shown in FIGS. 19A and 19B respectively, show internal components of the multi-function button 50. As shown in cross-section A-A in FIG. 19A, the integrated multi-function button 50 includes wing-tip base portion 21 which defines the face plate of the button. The underside of this faceplate supports an in-molded plunger 51 that can move downward to actuate switch 55 on the multi-function button frame 56 disposed within the device body housing 11 when the outer side of wingtip base portion 21 is depressed. Gasket/bore seal 52 supports the underside of base portion 21 spaced slightly apart (e.g. 0.5 mm or less) from the housing 11 with the plunger 51 disengaged from the switch. (While "downward" refers to the directional orientation shown in the figures, it is appreciated that this "downward" direction would actually be inward toward the user when the earbud device is worn in the ear). Gasket/bore seal 52 is coupled to retention clip 53 and the gasket/bore seal 52 is flexible such that pressing of the faceplate/wingtip base portion 21 flexes the gasket/bore seal 52 downward and shim/shoulder 53 pushes plunger 51 downward to engage switch 55. As can be seen in cross-section B-B in FIG. 19B, the gasket/bore seal 52 allows the wingtip base portion 21 to be pre-loaded with the faceplate/wingtip base portion 21 to the disengaged switch position, while the retention clip 54 provides a hard-stop when depressing the base portion 21 and plunger 51 towards the switch. FIG. 19C shows that the wingtip anchor 20 is securely attached to the housing 11 of the device body by screw 40 that interfaces with threaded insert 14 in wingtip portion 20. This screw 40 is inserted during assembly of the device body, such that the wingtip anchor 20 is non-removable by the user. This attachment point allows the wingtip anchor 20 to pivot such that the outer face of the base portion 21 can move slightly back and forth to actuate the multi-function button. As shown, the base portion 21 is pre-loaded so as to be slightly spaced apart from the housing 11 of the device body 10. This aspect is shown in the cross-sections of FIGS. 19A-19B and also in the outside view of FIG. 20. In this embodiment, the wingtip base portion 21 is spaced apart from the housing 11 of the earbud device body by d4, which is 2 mm or less, typically 1 mm or less, preferably about 0.4 mm.

Additional details regarding internal components of the earbud device body and a multi-function button can be further understood by referring to U.S. Provisional Patent Application No. 17/223,655, entitled "Wireless Audio Device," filed on Feb. 26, 2021, which is hereby incorporated herein by reference in its entirety. While the wingtip anchor described above can be utilized in most any earbud device, including hardwired earbuds, the design is particularly advantageous for use in wireless acoustic earbuds, which typically are bulker due to larger acoustic volumes and heavier due to the additional components including a wireless antenna and user interface features, such as the multi-function button.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. Also, while different embodiments of the invention were disclosed above, the specific details of particular embodiments may be combined in any suitable manner without departing from the spirit and scope of embodiments of the invention. Further, it will be apparent to one of ordinary skill in the art that many modifications and variations are possible in view of the above teachings. As used herein, the term "about" is understood to mean +/−10%.

Finally, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A portable acoustic device worn in an ear of a user, the device comprising:

a device housing defining an internal cavity, wherein the device housing is sized and shaped to reside, at least partly, within a lower concha of the ear of the user, wherein the device housing has an inner side that engages the lower concha and an outer side that faces away from the user when worn in the ear;

an acoustic port formed through an audio nozzle defined by the device housing that is aligned with an auditory canal of the user in the lower concha;

an audio driver disposed within the device housing and aligned to emit sound through the acoustic port; and an anchor extending from the device housing for securing the device within the ear of the user, wherein the anchor includes a base portion and a projection portion, wherein the base portion couples to the device housing and extends in a rearward direction when worn in the device of the user;

wherein the projection portion extends distally upwards and in a forward direction, when the device is worn in the ear of the user, wherein the projection portion further extends in an inward direction towards the user, when the device is worn in the ear of the user, so that a distal end of the projection portion is disposed within the upper concha of the ear such that a force exerted by the inferior root of the antihelix secures the device housing within the lower concha with the acoustic port secured in the auditory canal.

2. The portable acoustic device of claim 1, wherein the anchor is an integrally formed component.

3. The portable acoustic device of claim 1, wherein the base portion extends from the outer facing side of the device housing.

4. The portable acoustic device of claim 3, wherein the outer side of the device housing protrudes at least 10 mm from the inner side of the device housing that engages the lower concha so as to provide sufficient clearance to extend over the crus helix of the ear.

5. The portable acoustic device of claim 1, wherein a distal portion of the projection portion angles inward at an angle between 40-50 degrees relative a horizontal plane extending through the acoustic port so that the distal portion enters the upper concha.

6. The portable acoustic device of claim 5, wherein the base portion of the anchor extends in a rearward direction between 110 and 130 degrees relative the horizontal plane extending through the acoustic port.

7. The portable acoustic device of claim 5, wherein the projection portion extends upwards by a vertical distance between 15 and 25 mm from the horizontal plane extending through the acoustic port so as to accommodate a range of ear sizes.

8. The portable acoustic device of claim 5, wherein the distal portion of the projection portion has a flattened outer surface to facilitate engagement against the inner facing surface of the lower crura.

9. The portable acoustic device of claim 8, wherein a width of the flattened outer surface along the distal portion is between 2 and 5 mm.

10. The portable acoustic device of claim 8, wherein a majority of a width of the flattened outer surface of the projection portion is between 2 mm and 8 mm.

11. The portable acoustic device of claim 5, wherein the base portion has a flattened outer surface defining a faceplate of a multi-function button.

12. The portable acoustic device of claim 11, wherein a majority of a width of the flattened outer surface of the base portion is between 8 and 15 mm.

13. The portable acoustic device of claim 1, wherein the projection portion is curved along a curve that extends rearward from the base portion and extends forward in a distal direction, wherein the curve has a radius between 15 and 25 mm.

14. The portable acoustic device of claim 1, wherein the device housing is hard plastic that is shaped and contoured to substantially fill the lower concha of the ear.

15. The portable acoustic device of claim 1, wherein the device housing has a generally elongated shape having a length dimension between 15 and 20 mm, a height dimension between of 10 and 15 mm and a width dimension between 10 and 15 mm, so as to substantially fill the lower concha of the ear.

16. The portable acoustic device of claim 1, wherein the anchor is a separate component that is coupled to the device housing by the base portion.

17. The portable acoustic device of claim 16, wherein the anchor is attached to the device housing such that it non-removable by the user.

18. The portable acoustic device of claim 16, wherein the anchor comprises a polymer having a shore hardness between 0 and 80 on a shore A scale.

19. The portable acoustic device of claim 16, wherein the anchor comprises a polymer having a shore hardness of about 50 on a shore A scale.

20. A portable acoustic device worn in an ear, the device comprising:

a device housing defining an internal cavity, wherein the device housing has a generally rounded elongate shape sized for placement in a lower concha of the ear and having an inner facing side for engaging with the inferior concha;

an acoustic port formed through an acoustic nozzle defined by the device housing along the inner facing side;

an audio driver disposed within the device housing and aligned to emit sound through the acoustic port; and an anchor coupled to the device housing, the anchor including a base portion and a projection portion, wherein the base portion is coupled with an outer side of the device housing, when worn in the ear, and extends in an upward and rearward direction, wherein the base portion is disposed at least 10 mm in an outward direction from the acoustic port such that the anchor extends over the crus helix;

wherein the projection portion extends distally in a forward direction and extends in an inward direction at an angle between 40 and 50 degrees so that a distal end of the projection portion engages the upper concha.

* * * * *